US010417702B2

(12) United States Patent
Vernal et al.

(10) Patent No.: US 10,417,702 B2
(45) Date of Patent: Sep. 17, 2019

(54) DYNAMICALLY PROVIDING A THIRD-PARTY CHECKOUT OPTION

(71) Applicant: Facebook, Inc., Menlo Park, CA (US)

(72) Inventors: Michael Vernal, San Francisco, CA (US); Yuji Higaki, Mountain View, CA (US); Deborah Liu, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 585 days.

(21) Appl. No.: 14/037,357

(22) Filed: Sep. 25, 2013

(65) Prior Publication Data

US 2015/0052036 A1     Feb. 19, 2015

Related U.S. Application Data

(60) Provisional application No. 61/866,032, filed on Aug. 14, 2013.

(51) Int. Cl.
*G06Q 30/02*     (2012.01)
*G06Q 40/00*     (2012.01)

(52) U.S. Cl.
CPC ............. *G06Q 40/00* (2013.01); *G06Q 30/02* (2013.01)

(58) Field of Classification Search
None
See application file for complete search history.

(56) References Cited

U.S. PATENT DOCUMENTS

| 7,376,891 B2* | 5/2008 | Hitchock et al. ............ 715/221 |
| 8,438,079 B1 | 5/2013 | Nguyen et al. |
| 2002/0065774 A1* | 5/2002 | Young et al. .................. 705/41 |
| 2002/0103712 A1* | 8/2002 | Rollins et al. ................. 705/26 |

(Continued)

FOREIGN PATENT DOCUMENTS

| JP | 2014-521147 A | 8/2014 |
| KR | 10-0836754 | 6/2008 |
| WO | WO 2012-161435 | 11/2012 |

OTHER PUBLICATIONS

International Search Report issued in PCT/US2013/061856 dated May 19, 2014.

(Continued)

*Primary Examiner* — Robert R Niquette
*Assistant Examiner* — William J Jacob
(74) *Attorney, Agent, or Firm* — Keller Jolley Preece

(57) ABSTRACT

Methods for facilitating financial transactions include facilitating or otherwise increasing the ease and speed of checkout processes. In particular, one or more implementations comprise an e-commerce payment facilitator that acts as an intermediary between a commerce application and a payment gateway. The e-commerce payment facilitator can provide stored payment information to a commerce application based on a few simple selections by a user. This allows a user to easily and securely complete commerce transactions, which simplifies the user's checkout experience and reduces barriers to purchase. Furthermore, the e-commerce payment facilitator can pass payment details to the commerce application's payment gateway. In addition to the foregoing, methods involve dynamically and intelligently providing a user the option of using payment information stored by the network application.

20 Claims, 15 Drawing Sheets

(56) References Cited

U.S. PATENT DOCUMENTS

| | | | |
|---|---|---|---|
| 2002/0138445 A1* | 9/2002 | Laage et al. | 705/67 |
| 2004/0093281 A1* | 5/2004 | Silverstein et al. | 705/26 |
| 2006/0047847 A1* | 3/2006 | Saccocio | 709/235 |
| 2009/0089176 A1* | 4/2009 | McCabe | 705/26 |
| 2009/0299878 A1 | 12/2009 | Keresman, III et al. | |
| 2011/0106617 A1* | 5/2011 | Cooper et al. | 705/14.49 |
| 2012/0078766 A1 | 3/2012 | Rose et al. | |
| 2013/0006916 A1 | 1/2013 | McBride et al. | |
| 2013/0103584 A1 | 4/2013 | Eichner et al. | |
| 2013/0218716 A1* | 8/2013 | Godsey et al. | 705/26.8 |
| 2013/0297392 A1* | 11/2013 | Cincera et al. | 705/14.25 |
| 2013/0313316 A1* | 11/2013 | Jones | 235/383 |
| 2014/0025467 A1* | 1/2014 | Nagarajan et al. | 705/14.26 |
| 2014/0032294 A1* | 1/2014 | Donlan et al. | 705/14.17 |
| 2014/0046748 A1* | 2/2014 | Nagarajan et al. | 705/14.35 |
| 2014/0123057 A1* | 5/2014 | Eigner et al. | 715/780 |
| 2016/0125397 A1* | 5/2016 | Strydom | G06Q 20/08 705/66 |

OTHER PUBLICATIONS

U.S. Appl. No. 14/279,062, filed May 15, 2014, Linden.
U.S. Appl. No. 14/284,250, filed May 21, 2014, Linden.
Examination Report as received in Australian Application No. 2013397930 dated Jun. 1, 2018.
Office Action as received in Japanese application 2016-534569 dated Oct. 17, 2017.

* cited by examiner

DYNAMICALLY PROVIDING A THIRD-PARTY CHECKOUT OPTION

CROSS REFERENCE TO RELATED APPLICATIONS

This application claims priority to and the benefit of U.S. Provisional Application No. 61/866,032 filed Aug. 14, 2013. This application is also related to U.S. patent application Ser. No. 13/116,945, filed on May 26, 2011, entitled "Social Data Inputs." The entire contents of the foregoing applications are hereby incorporated by reference in their entirety.

BACKGROUND OF THE INVENTION

1. The Field of the Invention

One or more embodiments of the present invention relate generally to processing payments. More specifically, one or more embodiments of the present invention relate to systems and methods of increasing the ease of making payments using e-commerce applications.

2. Background and Relevant Art

Commerce applications allow users to perform real-world monetary transactions over a communications network. Examples of commerce applications include websites and native applications. Commerce applications allow users to purchase goods and/or services using a virtual shopping cart and a checkout process. The checkout process can involve providing payment information (such as credit card or debit card information) to the commerce application to complete an order. Typically, after the payment information is submitted, the commerce application will use a payment gateway to obtain payment authorization and securely pass payment information to a payment processor.

While commerce applications can increase shopping ease and allow users to make purchases without visiting a brick and mortar store, the checkout process in many commerce applications can be inconvenient. For instance, commerce applications typically require a user to provide detailed payment information. In many cases, a user may need to fill-in up to twenty information fields. It is common for potential consumers using a commerce checkout process to have difficulty entering payment information, run-out of time, or question otherwise become frustrated with the checkout process. Such frustrations often cause potential consumers to abandon their commerce transactions. Frustration with commerce checkout processes is often exacerbated when using a mobile device due to the small screen and difficulty of typing-in large amounts of information.

To reduce the problems associated with the checkout processes, some commerce applications allow users to create an "account" that allows a user to provide payment information to the application once, and then save that payment information with the commerce application for later use. For example, during an initial purchase, a user may provide a username and password along with payment information, which is saved to an "account" associated with the user. Upon subsequent visits to that commerce website, the user may enter the username and password combination to access their account and make additional purchases without being required to re-enter the payment information. While this helps reduce some of the complications that arise from checkout processes, such systems require the commerce application to be Payment Card Industry ("PCI") compliant and are typically only valid at a single website.

In view of the foregoing issues, some commerce applications have integrated with third parties providing "virtual wallet" services, including but not limited to PayPal™ and Google Wallet™ payment services. These virtual wallet services allow users to create an account storing their payment information that can be used across more than one commerce application. Typically, commerce applications must "integrate" with such virtual wallet services by allowing users to be redirected, mid-checkout, to a page of the virtual wallet service where the user can enter virtual wallet credentials and/or review stored payment information. The virtual wallet service performs the financial settlement itself using a financial network and then issues a credit to an account of the merchant providing the commerce application. While the virtual wallet approach can provide some advantages, many commerce applications do not want to explicitly integrate with the virtual wallet service or allow the virtual wallet service to run the transaction through their payment gateway. Additionally, checkout processes involving a virtual wallet service can often be confusing and disrupting, as a user attempting to make a purchase at a commerce application is suddenly redirected to a completely different website to complete the transaction using the virtual wallet service.

In addition to the foregoing, virtual wallets typically require that the commerce application display a "buy with the virtual wallet" button in every virtual cart. As most users are not pre-enrolled with a virtual wallet, this can be confusing and lead to abandoned carts when un-enrolled users mistakenly select the virtual wallet's "buy" button when attempting to make a traditional commerce purchase. The inconvenience of requiring the placement of a "buy with the virtual wallet" button is often increased with mobile commerce applications in which screen space is at a premium.

Accordingly, there are a number of considerations to be made in commerce checkout and payment processing.

BRIEF SUMMARY OF THE INVENTION

Embodiments of the present invention provide benefits and/or solve one or more of the foregoing or other problems in the art with methods and systems for increasing the ease and efficiency of commerce payment and checkout processes. In particular, one or more embodiments help reduce checkout inconveniences and associated abandoned transactions by providing payment information for a user. Furthermore, the one or more embodiments can provide this benefit while allowing the commerce application to process the transaction using their existing relationships with payment gateways.

Thus, one or more embodiments can allow a commerce application to provide an improved, checkout flow that reduces or eliminates the burden on users to provide payment information during checkout. Furthermore, the improved checkout flow can easily integrate into commerce applications and allow users to easily and quickly authenticate themselves and pay for goods and/or services across multiple commerce applications. Additionally, one or more embodiments can intelligently and dynamically provide the option to use stored payment information when the option will likely increase the likelihood of a purchase. Furthermore, when the option to use stored payment information will not likely increase the likelihood of a purchase, the option may not be provided; thereby reducing graphical interface clutter.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots) are used herein to illustrate optional features or operations that add additional features to embodiments of the invention. Such notation, however, should not be taken to mean that these are the only options or optional operations, and/or that blocks with solid borders are not optional in certain embodiments of the invention. Understanding that these drawings depict only typical embodiments of the invention and are not therefore to be considered limiting of its scope, the invention will be described and explained with additional specificity and detail through the use of the accompanying drawings, which is briefly described below.

DETAILED DESCRIPTION

One or more embodiments of the present invention increase the ease and efficiency of commerce payment and checkout processes. In particular, one or more embodiments help reduce checkout inconveniences and associated abandoned transactions by providing payment information for a user. Furthermore, the one or more embodiments can provide this benefit while allowing the commerce application to process the transaction using their existing relationships with payment gateways.

Thus, one or more embodiments can allow a commerce application to provide an improved, checkout flow that reduces or eliminates the burden on users to provide payment information during checkout. Furthermore, the improved checkout flow can easily integrate into commerce applications and allow users to easily and quickly authenticate themselves and pay for goods and/or services across multiple commerce applications. Additionally, one or more embodiments can intelligently and dynamically provide the option to use stored payment information when the option will likely increase the likelihood of a purchase. Furthermore, when the option to use stored payment information will not likely increase the likelihood of a purchase, the option may not be provided, thereby reducing graphical interface clutter.

In particular, one or more embodiments of the present invention include an e-commerce payment facilitator that acts as an intermediary between a commerce application and a payment gateway. The e-commerce payment facilitator can provide stored payment information to a commerce application based on a few simple selections by a user. This allows a user to easily and securely complete commerce transactions, which simplifies the user's checkout experience and reduces barriers to purchase. Furthermore, the e-commerce payment facilitator can pass payment details to the commerce application's payment gateway. This allows transactions provided by the e-commerce payment facilitator to fund and settle transactions using the same channels and networks with which the provider of the commerce application is accustom to dealing.

Figure 1:
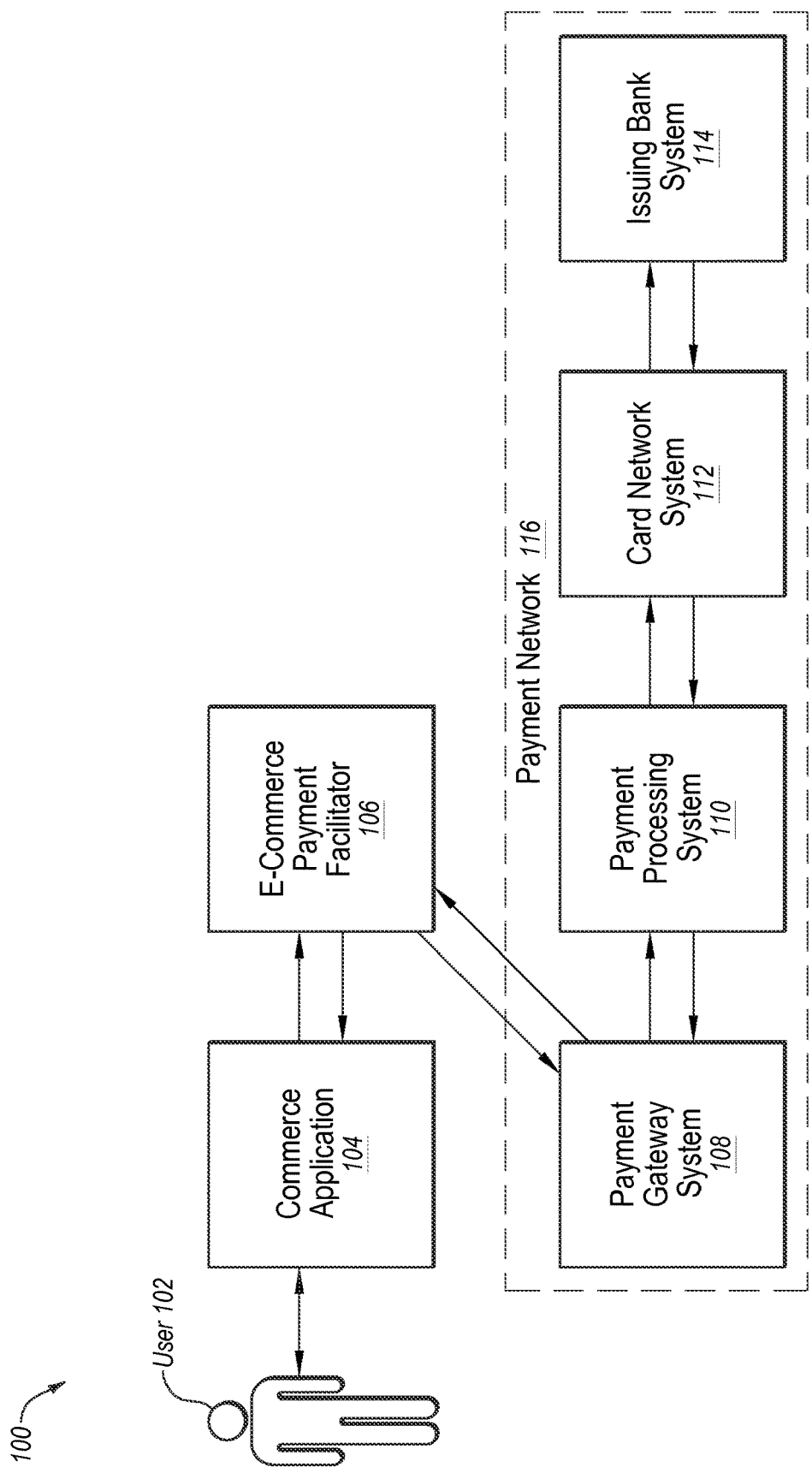
FIG. 1 illustrates a schematic diagram of a system for facilitating a purchase using a commerce application in accordance with one or more embodiments of the present invention.

For example, FIG. 1 is a schematic diagram illustrating a system 100 in accordance with an embodiment of the present invention. An overview of the system 100 will be described next in relation to FIG. 1. Thereafter, a more detailed description of the components and processes of the system 100 will be described in relation to the remaining FIGS.

As illustrated by FIG. 1, the system 100 can include a user 102, a commerce application 104, an e-commerce payment facilitator 106, and a payment network 116. The commerce application can interact with an e-commerce payment facilitator 106 to simplify the user's 102 checkout experience at the commerce application 104. To complete a financial transaction, the e-commerce payment facilitator 106 can interact with a payment gateway system 108 for the purpose of processing a payment using the payment network 116. The payment network 116 can include a payment gateway system 108, a payment processing system 110, a card network system 112, and an issuing bank system 114. In other embodiments, however, the payment network 116 includes more or fewer actors, though in most embodiments of the invention the payment network 116 includes at least a payment gateway system 108. As explained in greater detail below, each component of the system can execute on and/or be implemented by one or more computing devices.

The embodiment illustrated in FIG. 1 includes a user 102 accessing a commerce application 104. As explained in greater detail below, the commerce application 104 can comprise a network application, such as a web application or a native application. The commerce application 104 can offer the sale of goods and/or services to the user 102. The user 102 may begin an order by selecting one or more items or services offered through the commerce application 104. To complete the order, the user 102 traditionally would be required to enter up to 20 different payment fields, such as a first name, middle name, last name of the user, a payment card (credit card, debit card, etc.) number, an expiration date (year and/or month) of the payment card, a billing address (including street name, house number, city, state or province, zip code, country, etc.) associated with the payment card, a phone number associated with the payment card, and one or more shipping addresses (including fields similar to the billing address).

The e-commerce payment facilitator 106 can store payment information for the user 102, and can provide at least a portion of the information to the commerce application 104 to simplify the checkout experience of the user 102. More specifically, commerce application 104 can display or otherwise provide a selectable option to use payment information maintained by the e-commerce payment facilitator 106. If the user 102 selects the selectable option, the commerce application can complete the transaction with the assistance of the e-commerce payment facilitator 106. For example, the commerce application 104 can request payment information from the e-commerce payment facilitator 106. In response to the request, the e-commerce payment facilitator 106 can provide payment information and a payment token to the commerce application 104.

The commerce application 104 can auto-fill the payment information into checkout payment fields. As mentioned above, auto-filling the payment fields using payment information from the e-commerce payment facilitator 106, can increase the ease of the checkout process for the user. In at least one embodiment, the e-commerce payment facilitator 106 does not send the complete payment card number to the commerce application 104. Instead, the e-commerce payment facilitator 106 can send a card number label (i.e., "X's" for all of the digits of the payment card except the last for digits) and the payment token. The use of the payment token and payment card label can allow the commerce application 104 to avoid the need to be PCI compliant. Furthermore, by preventing the commerce application 104 from receiving the full payment card number of the user 102, the e-commerce payment facilitator 106 can increase security and reduce fraud by allowing the user 102 to purchase items from any number of commerce applications using one or more payment cards without ever having to provide the payment card number to the commerce applications.

Upon reviewing the auto-filled payment information, the user 102 can authorize the purchase of the order. The commerce application 104 can forward the authorization along with the payment token to the e-commerce payment facilitator 106. Upon receiving the authorization and the payment token, the e-commerce payment facilitator 106 can pass payment information (including the full payment card number) as a transaction (typically over a communication network) to the payment gateway system 108. As explained in greater detail below, the payment token can map to the payment card number and allow the e-commerce payment facilitator 106 to find and send the payment card number to the payment gateway system 108.

Once the transaction is received from the e-commerce payment facilitator 106, the payment gateway system 108 then passes the transaction to the processor (e.g., payment processing system 110) used by the merchant's acquiring bank. Based upon the type of the payment card, the payment processing system 110 can transmit the transaction to an appropriate card network system 112. The card network system 112 can then pass the transaction to an issuing bank system 114 that issued the payment card to the user 102.

The issuing bank system 114 either approves or declines the transaction, and sends the decision back to the card network system 112. The decision is then transmitted from the card network system 112 back to the acquiring bank's preferred payment processing system 110. The payment processing system 110 can then forward the decision back to the payment gateway system 108. The payment gateway system 108, in one or more embodiments, stores the details concerning the transaction and the decision, and then passes the decision back to the e-commerce payment facilitator 106.

The payment gateway system 108 can also perform settlement tasks, including submitting a daily settlement batch of captured transactions to the acquiring bank via the acquiring bank's preferred payment processing system 110. The payment processing system 110 then passes the settlement batch to a server of the acquiring bank (not illustrated), which deposits the funds from the user 102/commerce application 104 transaction into the merchant's account. Then, the acquiring bank sends a request for funds in satisfaction of this order to the payment processing system 110, which passes the funding request to the appropriate card network system 112, which in turn passes the funding request to the issuing bank system 114. Then, the issuing bank system 114 posts the transaction to the user's 102 account and passes a release of the funds to the card network system 112, which are then passed to the payment processing system 110 and then the acquiring bank.

One will appreciate in light of the disclosure herein that the e-commerce payment facilitator 106 can provide numerous benefits to both the user 102 and the commerce application 104. For example, the e-commerce payment facilitator 106 can reduce or eliminate the need for the user 102 to fill out multiple payment fields during a checkout process by providing the information to be automatically filled in the payment fields. This can greatly increase the ease and speed of the checkout process for the user 102. The increased ease for the user 102 can reduce abandoned carts; and thus, increase sales for the commerce application 104.

Additionally, the e-commerce payment facilitator 106 can allow the user 102 to make purchases at virtually any commerce application 104 using their stored payment information without having to provide their full payment card (credit card, debit card etc.) information to any of the commerce applications 104. Thus, the e-commerce payment facilitator 106 can increase ease of making purchases using commerce applications 104, while also increasing security.

Figure 2:
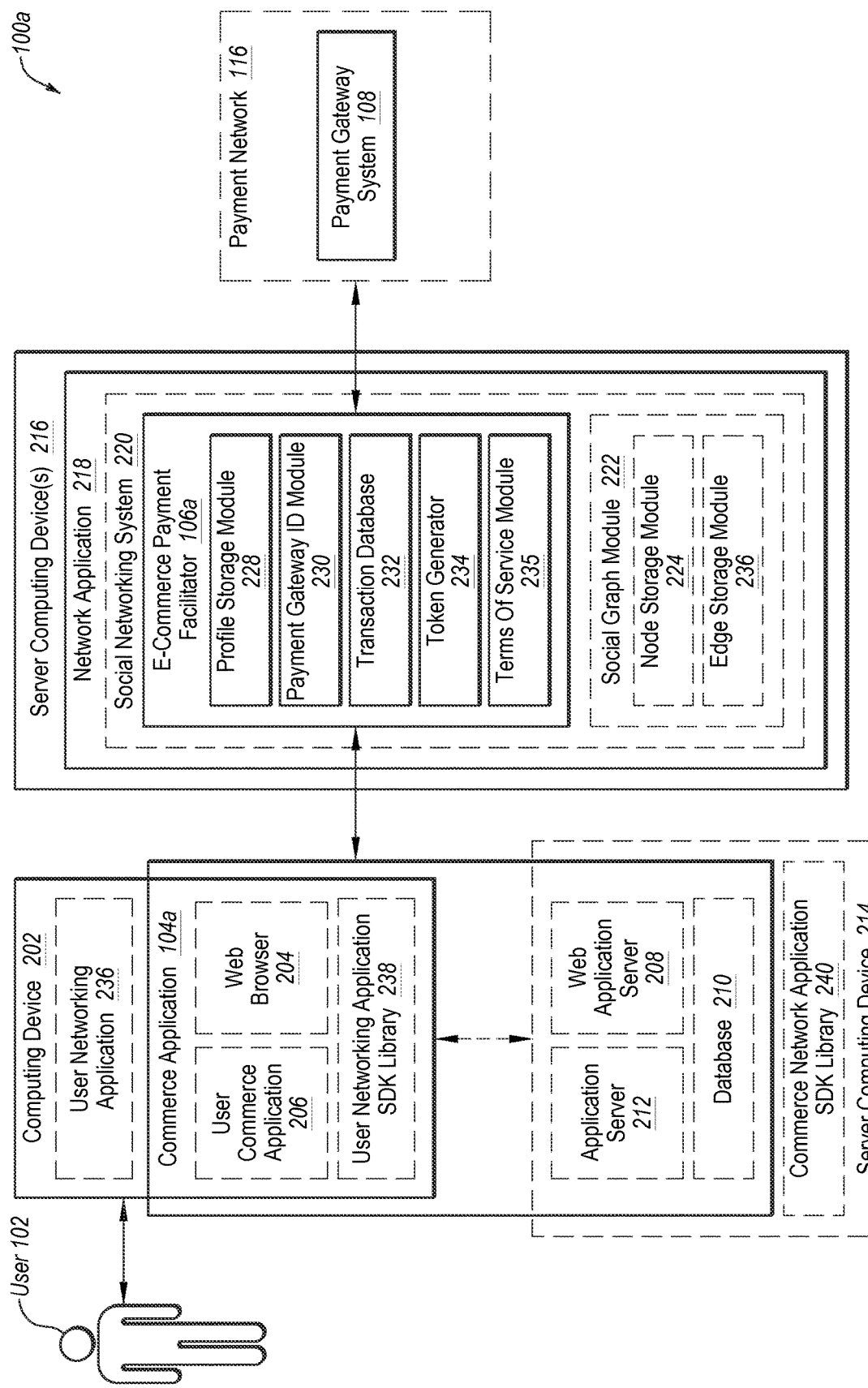
FIG. 2 illustrates a detailed schematic diagram of a commerce application, a network application, and a payment network of the system of FIG. 1 in accordance with one or more embodiments of the present invention.

FIG. 2 illustrates a schematic diagram illustrating a system 100a in accordance with an embodiment of the present invention. System 100a illustrates one example embodiment of system 100. In particular, FIG. 2 illustrates one embodiment of a commerce application 104a and an e-commerce payment facilitator 106a. As shown by FIG. 2, the user 102 can use a computing device 202 to access a commerce application 104a. In embodiments where the commerce application 104a is a web application, the user 102 may interface with the commerce application 104a using a web browser 204 application or a user commerce application 206 (also referred to as a special-purpose client application later herein), and thus these applications may or may not be considered as part of the commerce application 104a.

In such embodiments where the commerce application 104a is a web application, the backend of the commerce application 104a (i.e., the set of applications providing data and logic for the commerce application 104a) may include a web application server 208 (including but not limited to the Apache HTTP Server by the Apache Software Foundation, Internet Information Services (IIS) by Microsoft Corporation, nginx by NGINX, Inc., the open-source lighttpd web server, and Google Web Server (GWS) by Google Inc.) and optionally a relational or non-relational database 210 (including but not limited to MySQL by Oracle Corporation, PostgreSQL by the PostgreSQL Global Development Group, Apache Cassandra by the Apache Software Foundation, HBase by the Apache Software Foundation, and MongoDB by 10gen).

In embodiments where the commerce application 104a is a native application, the user 102 utilizes the user commerce application 206), which may utilize an application server 212 (e.g., a Java application server) and/or database 208 of a separate server computing device 214 and thus be deemed a network application, or may not utilize the application server 212 or database 210 and thus be deemed a "stand-alone" application. Accordingly, depending upon the context of the term "commerce application," this term may refer to software executing on the user's computing device 202 and/or the server computing device 214. In particular, at least a first portion of the commerce application software can execute on the user's computing device 202 and at least a second portion of the commerce application software can execute on the set of one or more server computing devices 214.

The commerce application 104a can interact with an e-commerce payment facilitator 106a to obtain payment information for users, such as user 102. Additionally, the e-commerce payment facilitator 106a can interact with a payment gateway system 108 of a payment network 116 to process transactions as described hereinabove in relation to FIG. 1. The depicted embodiments illustrate a single payment gateway system 108 and a single payment network 116. One will appreciate in light of the disclosure herein that the invention is not so limited and the e-commerce payment facilitator 106a can interface with any number of different payment gateway systems and payment networks to process payments and financial transactions. For example, the e-commerce payment facilitator 106a can interface with a first payment gateway system 108 for a first commerce application 104a, and interface with a second payment gateway system for a second commerce application.

The system 100a of the embodiment illustrated in FIG. 2 includes a set of one or more server computing devices 216 that provide a network application 218 including an e-commerce payment facilitator 106a. In one or more embodiments of the invention, the network application 218 comprises a social-networking system 220 (such as but not limited to FACEBOOK™), but in other embodiments the network application 218 may comprise another type of application, including but not limited to an e-mail application, search engine application, banking application, or any number of other application types that utilize user accounts. In one or more embodiments where the network application 218 comprises a social-networking system 220, the network application 218 may include a social graph module 222 for representing and analyzing a plurality of users and concepts. A node storage module 224 of the social graph module 222 can store node information comprising nodes for users, nodes for concepts, and nodes for items. An edge storage module 226 of the social graph module 222 can store edge information comprising relationships between nodes and/or actions occurring within the social-networking system 220. Further detail regarding social-networking systems, social graphs, edges, and nodes is presented below with respect to FIG. 12.

The e-commerce payment facilitator 106a of the network application 218 can comprise a profile storage module 228 that provides storage for payment information of users of the network application 218. For example, the user 102 can create an "account" with the network application 218, which allows a user to provide the payment information to the network application 218. The network application 218 can then save that payment information in the profile storage module 228. In one or more embodiments the profile storage module 228 can store in relation to the user 102 one or more of: a first name, a middle name, a last name, a payment card number (e.g., a credit card, debit card), an expiration date (year and/or month) of the payment card, a card security code of the payment card (e.g., a Card Verification Value (CVV or CVV2)), a billing address (including street name, house number, city, state or province, zip code, country, etc.) associated with the credit card, a phone number associated with the credit card, one or more shipping addresses (including similar fields as the billing address). When the payment card comprises a debit card, the profile storage module can also store a personal identification number (PIN) for the debit card. In an embodiment where the network application 218 comprises a social-networking system 220, the payment information stored in the profile storage module 228 may be associated with a node of the node storage module 224 that represents the user 102.

In the depicted embodiment, the e-commerce payment facilitator 106a also includes a payment gateway identification module 230. Upon receiving a charge request from a commerce application 104a, the payment gateway identification module 230 can determine which payment gateway system 108 of a plurality of payment gateway systems is to be used to process the charge request. In an embodiment, the payment gateway identification module 230 utilizes the charge request and information stored in the profile storage module 228 to make this determination.

For example, in an embodiment of the invention, the profile storage module 228 is further configured to receive and/or store, for one or both of the commerce application 104a and the merchant operating the commerce application 104a, a payment gateway identifier that indicates which payment gateway system is to be used to process charge requests for the commerce application or merchant. Additionally, the profile storage module 228 may also include an application identifier (or merchant identifier, or account identifier) to be used when interacting with the identified payment gateway system to identify which account is to be credited with the funds from the user 102. In some embodiments of the invention, the payment gateway identification module 230 identifies the payment gateway system 108 based either in part or exclusively upon information from within the received charge request itself.

As shown by FIG. 2, in one or more embodiments the e-commerce payment facilitator 106a can include a transaction database 232. The transaction database 232 can store details of transactions started and/or completed for each user and/or each commerce application. Thus, the transaction database 232 can allow a user to retrieve details on all purchases made with help from the e-commerce payment facilitator 106a. One will appreciate that this can allow a user to login to the network application 218 and retrieve transaction details regarding purchases made on any number of different commerce applications. This provides a significant advantage, as users who do not utilize the e-commerce payment facilitator 106a may need to remember usernames and passwords and login into several commerce applications to get the information and details that the transaction database 232 can provide.

The transaction database 232 can provide for each transaction, attempted or completed, a date, an indication of the commerce application where the transaction was completed, an amount of the transaction, the items/services purchased as part of the transaction (optionally a URL of the open graph product), a status of the transactions (completed, shipped, in progress, returned, denied, etc.), a transaction ID that allows the users to provide to the commerce application to reference the transaction, or other details.

The transaction database 232 can allow users or merchants operating a commerce application to retrieve details regarding transactions, such as a history of transactions including one or more of the transaction details described above. When the network application 218 comprises a social network, the transaction database 232 can provide additional demographic information about the user who purchased items from the commerce application 104a (geographic location of users, age of user, gender of users, etc.) pulled from the social graph.

In addition to the foregoing, the e-commerce payment facilitator 106a can also include a token generator 234. The token generator 234 can generate payment tokens that the e-commerce payment facilitator 106a can send to the commerce application 104a rather than sending a payment card number. The token generator 234 can return a random string called a "token" as a pointer to the original payment card number. The token preferably has no algorithmic relationship with the original payment card number, so that the payment card number cannot be derived based on the token itself (such as by merely applying a decryption algorithm to the token). Accordingly, this token is not considered cardholder data, because it is a random string from which it is not possible to extrapolate any original cardholder data without the use of the token generator 234 and profile storage module 228, which contain a list of payment card numbers and the tokens to which they correspond. Payment tokens generated by the token generator 234, can allow a commerce application 104a to process a payment without having to comply with regulatory standards, e.g., the PCI DSS standards, as explained below.

The e-commerce payment facilitator 106a, in the embodiment depicted by FIG. 2, includes a terms of service (TOS) module 235. The TOS module 235 can determine if a user 102 identified in a request has indicated to the network application 218 that they wish to allow the commerce application 104a to utilize the payment information stored by the payment profile storage module 228 for the purpose of performing a checkout within the commerce application 104a. In one or more embodiments, a permission value is a Boolean value associated with a commerce application identifier that indicates whether the user 102 has granted that particular commerce application 104a the ability to utilize the user's payment information.

In one or more embodiments, upon the user 102 beginning a checkout flow within the commerce application 104a, the user 102 is presented with a user interface element seeking approval for the commerce application 104a to access the payment information of the user 102. If the user responds affirmatively, a user networking application 236 and/or library of a user networking application software development kit (SDK) library 238 (both to be described in detail later herein) executing on the computing device 102 can transmit an update permissions message to the e-commerce payment facilitator, causing the TOS module 235 to update the permission value for that user 102 and that commerce application 104a accordingly. In alternative embodiments, the TOS module 235, upon receipt of a charge request from a commerce application 104a for a user 102, utilize the permission value to determine if it should continue to issue the charge request to a payment gateway. However obtained, the TOS module 235 can ensure that the user has authorized the network application to provide payment information to a commerce application 104a prior to providing a user's payment information.

The embodiment of FIG. 2 also includes a user networking application 236. In an embodiment where the network application 218 comprises a social-networking system 220, the user networking application 236 allows the user 102 to utilize the social-networking system 220. The user networking application 236 can comprise a native social networking application that runs on a client device. For example, in one or more embodiments the user networking application 236 can comprise a FACEBOOK™ native application. In alternative embodiments, the user networking application 236 might not strictly be for social networking purposes. The user networking application 236 can represent any native application executing on the computing device 202 that allows the user 102 to interact with the network application 218. In one or more embodiments, the user 102 utilizes the user networking application 236 to log in to a social-networking system 220, causing the computing device 202 to store an obfuscated user identifier in a portion of shared memory of the computing device 202. This obfuscated user identifier can later be utilized by the commerce application 104a to determine whether the payment information of the user 102 might be able to be used. In one or more embodiments, the user networking application 236 is also utilized by the user to grant or revoke permission for the commerce application 104a to utilize payment information of the user 102 from the network application 218 in its checkout flow. Additionally, if the user 102 has allowed the network application 218 to utilize its payment information and the user 102 has not provided any such payment information to the network application 218, the user networking application 236 may be utilized by the user 102 to initially provide that information.

The depicted embodiment also includes a user networking application SDK library 238. The user networking application SDK library 238 provides a set of routines for the user commerce application 104a to utilize to interact with the network application 218. In an embodiment, all interaction between the commerce application 104a and the e-commerce payment facilitator 106a flows through the user networking application SDK library 238. In one or more embodiments where at least some of the commerce application 104a executes on a server computing device 214, the server computing device 214 may include a commerce network application SDK library 240 that serves the same purpose, or works in conjunction with, the user networking application SDK library 238.

Figure 3A:
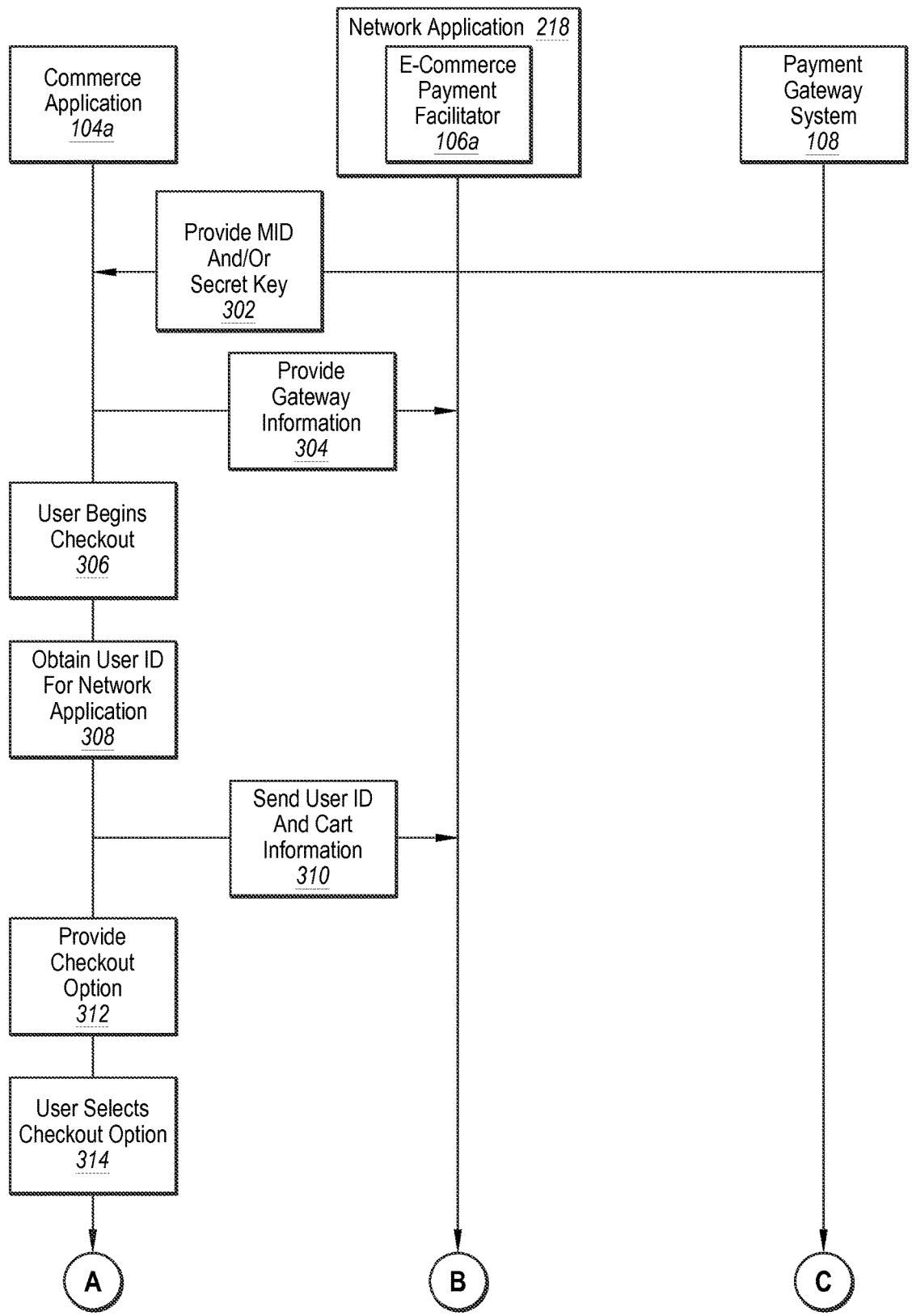
FIGS. 3A-3B illustrate a sequence-flow diagram illustrating interactions between the commerce application, network application, and payment network of FIG. 2 in accordance with one or more embodiments of the present invention.
Figure 3B:
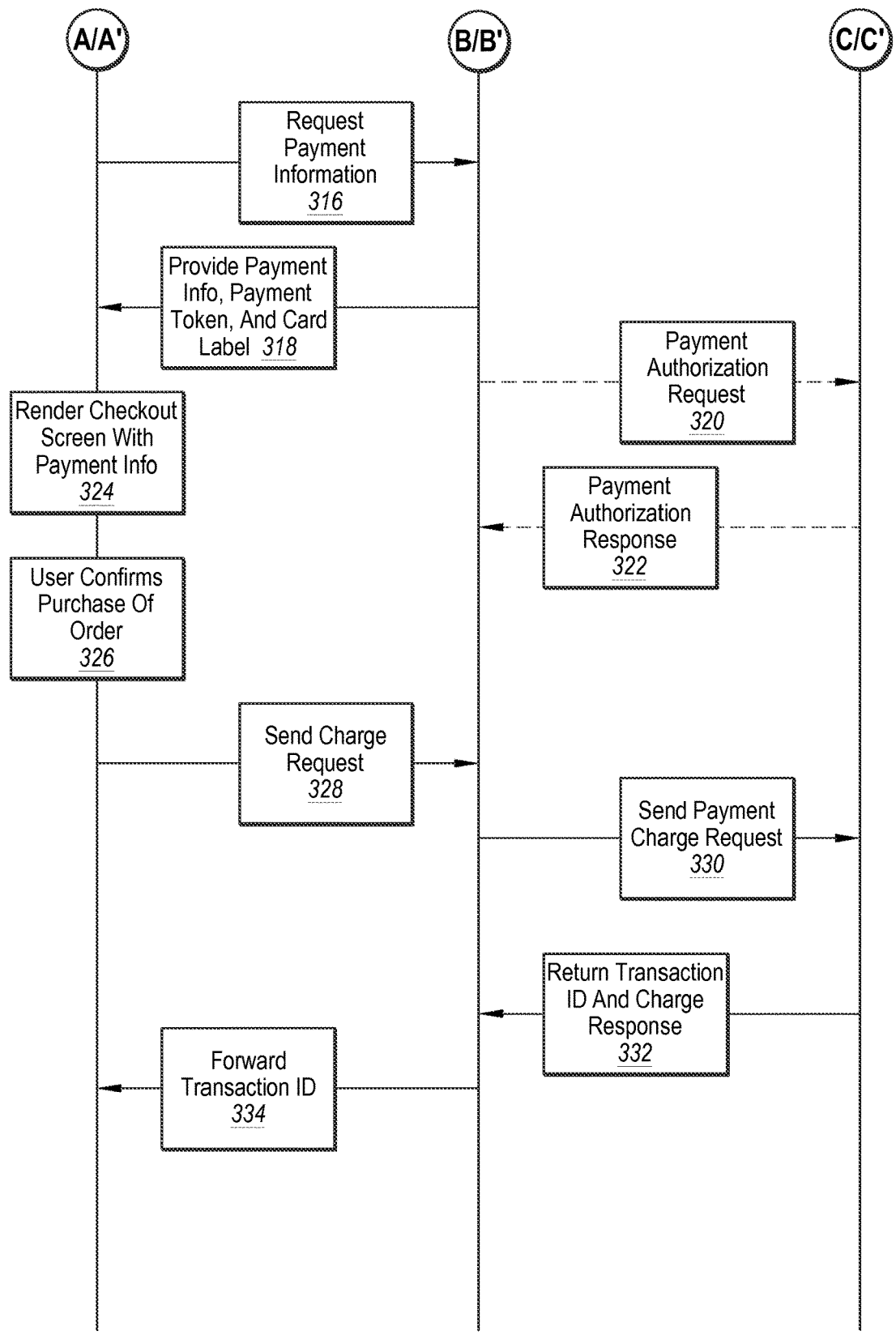

Referring now to FIGS. 3A and 3B, a sequence-flow diagram illustrating an embodiment of an e-commerce payment facilitator 106a providing payment information to a commerce application 104a. The diagram of FIGS. 3A-3B illustrate one embodiment of a timeline illustrating the interactions of the commerce application 104a, the e-commerce payment facilitator 106a, and the payment gateway system 108 in accordance with an embodiment of the present invention.

As shown, the commerce application 104a can set up an account with a payment gateway system 108. In alternative embodiments, the account/relationship between the commerce application 104a and the payment gateway system 108 can be preexisting. At some point the payment gateway system 108 can provide the commerce application 104a with a merchant identifier (MID) and/or a public key and private key 302. For example, when a merchant registers the commerce application 104a with the payment gateway system 108, the payment gateway system 108 can provide the commerce application 104a and/or the merchant with the MID and/or the public key/private key. The MID and/or the public key/private key can allow the commerce application 104a to interact with the payment gateway system 108 to process transactions and have funds deposited in an account associated with a merchant or the commerce application 104a. The MID and/or a public key/private key can allow the payment gateway system 108 to verify the identify of the commerce application 104a and any associated processing parameters (i.e., the account associated with the commerce application 104a, the payment processing system 110, the card network system 112, and bank system).

The commerce application 104a then provides the e-commerce payment facilitator 106a with gateway information 304 for the selected payment gateway system. The gateway information 304 can comprise an indication of the selected payment gateway system 108 to be utilized for charging requests issued by the commerce application 104a and account information (e.g., an account identifier) that indicates a financial account into which charged monetary amounts are to be deposited. The commerce application 104a can provide the selected payment gateway information 304 during the first interaction with the e-commerce payment facilitator 106a. Alternatively, a merchant operating the commerce application 104a can provide the gateway information 304 manually. For example, the merchant may provide this information to the e-commerce payment facilitator 106a using a website of the network application 218 or a native application for the network application 218.

Additionally, the gateway information can include an indication of the MID and the public/private keys, which can allow the e-commerce payment facilitator 106a to contact the selected payment gateway system 108 on behalf of the commerce application 104a to process financial transactions. In one or more embodiments, the commerce application 104a configures the preferred payment gateway system 108 to allow the commerce payment facilitator 106a to issue charge requests on behalf of the commerce application 104a such that the monetary amount will be credited to an account of the merchant operating that commerce application 104a directly from the payment gateway system 108 and not from an account of the network application 218. Alternatively, a merchant operating the commerce application 104a can manually configure the payment gateway system. For instance, the merchant can use a website of the payment gateway system 108 or a native application for the payment gateway system 108.

In addition to the foregoing, the e-commerce payment facilitator 106a or the network application 218 can provide the commerce application 104a an app access token or pre-agreed secret code. The app access token or pre-agreed secret code can allow the commerce application 104a to prove its identity and authenticity to the e-commerce payment facilitator 106a and/or the network application 218 when making API calls. In one or more embodiments, the e-commerce payment facilitator 106a or the network application 218 provides the app access token or pre-agreed secret via a server-to-server call.

As shown by 306, the user can begin a checkout process using the commerce application 104a. In particular, the user can place one or more items or services offered by the commerce application 104a into a virtual shopping cart. In one or more embodiments, the user can indicate to the commerce application 104a that they would like to checkout (e.g., selecting a checkout button or other option).

At this point, or before, the commerce application 104a can obtain, identify, or otherwise discover a user identifier 308 for the user for the network application 218. For example, the commerce application 104a can access an obfuscated (e.g., hashed, encrypted, or otherwise algorithmically transformed) user identifier of the user existing on the computing device 202 of the user. This user identifier can identify a user profile/account for that user of the network application 218 (e.g., a social networking application). In one or more embodiments of the invention, the user identifier is accessed from a portion of shared memory accessed by or reserved by the network application 218, and may only exist if the user is currently "logged on" to the network application 218. In one or more other embodiments, the user identifier is accessed from a cookie (e.g., HyperText Transfer Protocol (HTTP) cookie) or from application cache (e.g., a HyperText Markup Language version 5 (HTML5) application cache) on the user's computing device 202.

This process may serve as the authentication for the user, as the existence of a proper obfuscated user identifier for the network application 218 on the user's computing device 202 indicates that the user has already been authenticated by the network application 218, and thus the commerce application 104a may rely upon this previous authentication. Additionally, at this point of the checkout process, there is no security or privacy leak of the user's details to the commerce application 104a, which only has the obfuscated user identifier.

Upon the user beginning the checkout process 306, the commerce application 104a can optionally send to the e-commerce payment facilitator 106a the user ID and the cart information 310. In one or more embodiments of the present invention the commerce application 104a can send user ID and the cart information 310 prior to rendering a checkout screen. In addition to sending the user ID and the cart information 310, the commerce application 104a can also send the app access token or pre-agreed secret code that lets the network application 218 confirm the identity of the commerce application 104a. In one or more embodiments, the cart information can comprise a total price of the items/services in the virtual cart of the commerce application 104a.

In one or more implementations, the cart information can also additionally comprise detailed information about the items in the cart. For example, the cart information can comprise a JSON encoded array of cart items. Each JSON object in the array can comprise one or more of a name of the item, an amount of the item, the quantity of the item, and a URL of the product that the user desires to purchase. In still further embodiments, the cart information can comprise product names, product numbers (e.g., Stock-keeping units (SKUs), serial numbers, model numbers), product prices, product quantities, order dates, invoice numbers, and applicable taxes. In one embodiment, the detailed information about the items in the cart is provided at step 310. Additionally or alternatively, the detailed information about the items in the cart is provided to the e-commerce payment facilitator 106a (e.g., at step 316).

Figure 5B:
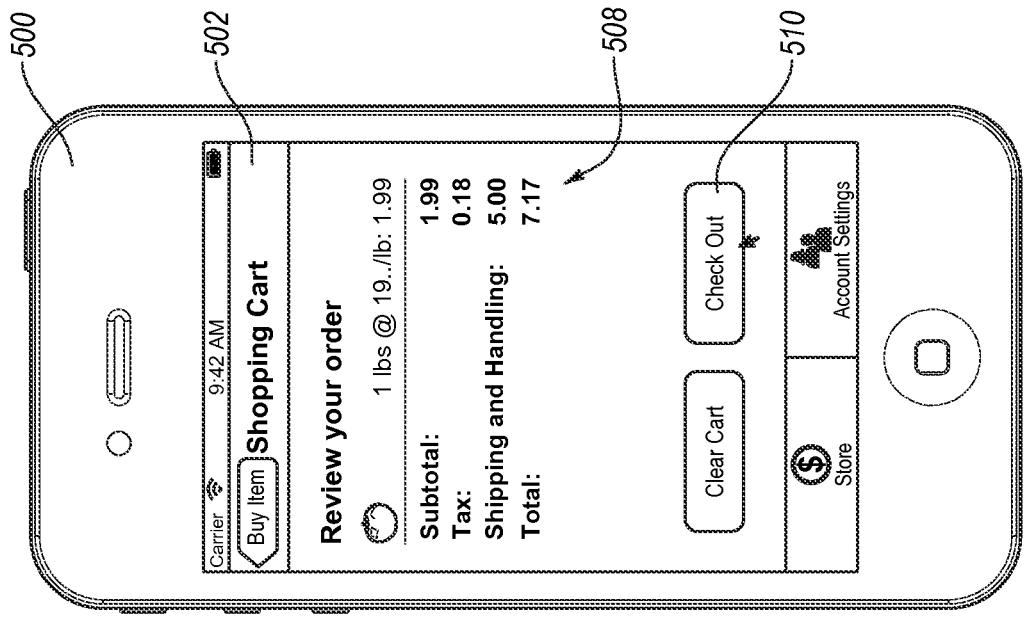
FIGS. 5A-5G illustrate user interfaces for completing a financial transaction using a commerce application in accordance with one or more embodiments of the present invention.
Figure 5C:
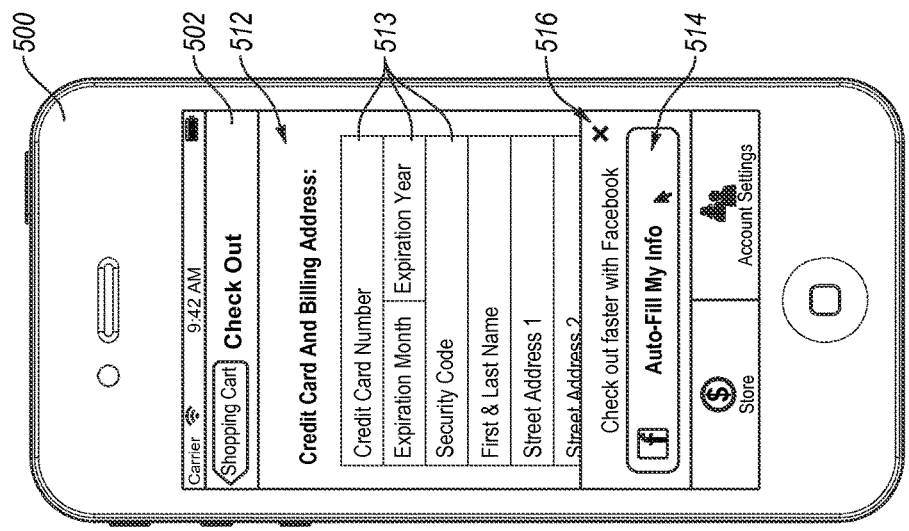
Figure 6:
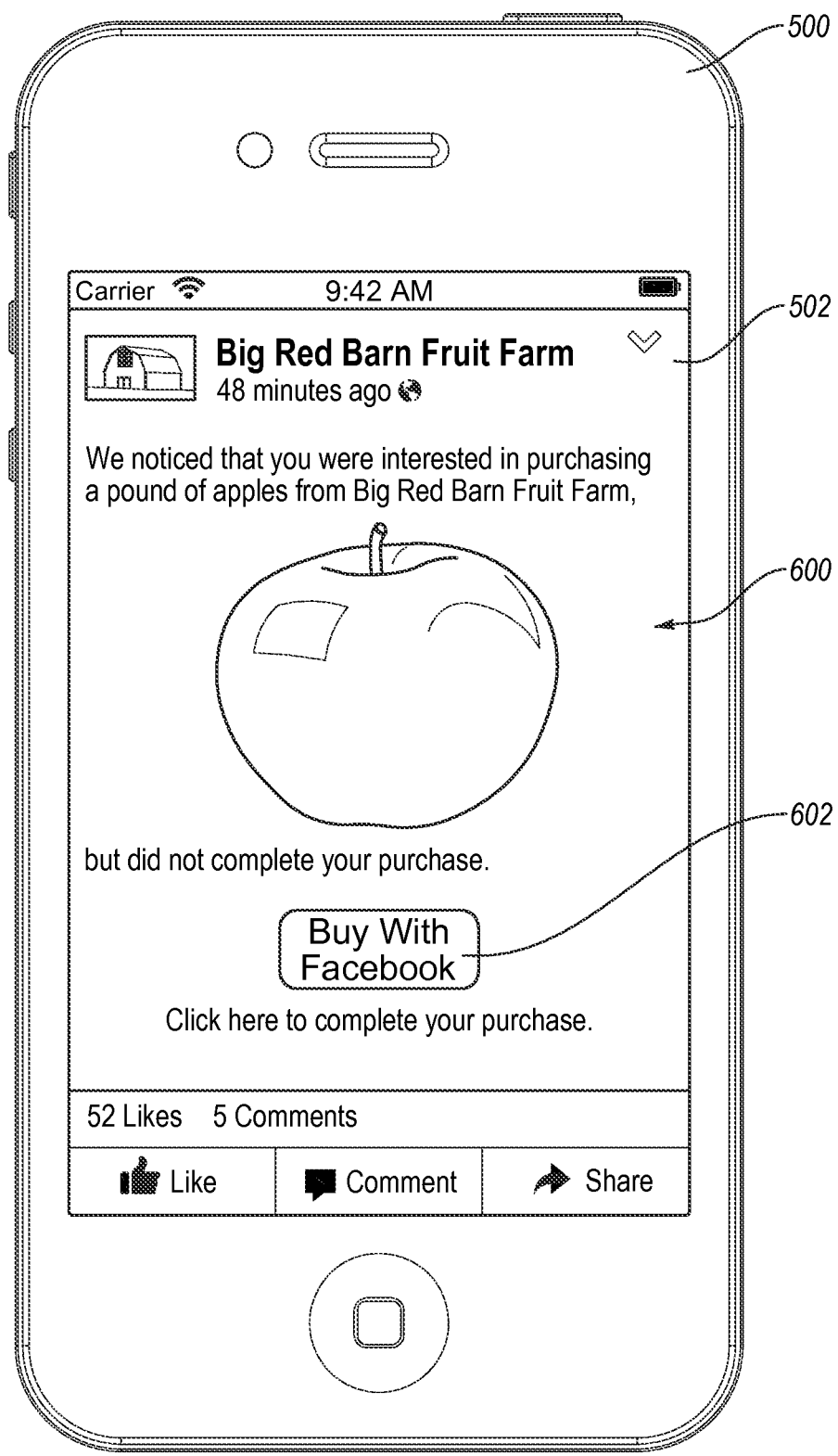
FIG. 6 illustrates a diagram of a purchase message that allows a user to complete a purchase of a virtual cart of a commerce application that was previously abandoned in accordance with one or more embodiments of the present invention.

The commerce application 104a can provide a checkout option 312 including a glyph (i.e., a mark, an icon, a graphic, a portion of text, etc.) indicating that the user may utilize the network application 218/e-commerce payment facilitator 106a to complete the purchase of the items in the virtual cart of the commerce application 104a. The checkout option can comprise a button presented in the checkout user interface of the commerce application 104a, a selectable overlay that appears over the checkout user interface of the commerce application 104a, a plug-in, a pop-up, or other selectable option. For example, in one or more embodiments such as when the commerce application 104a comprise a web application, an iframe may be added to the code defining the web page. Additionally or alternatively, the commerce application 104a can call an SDK function that renders the selectable option. One example of the checkout option is illustrated in FIG. 5C as element 514. Another example of a checkout option is illustrated in FIG. 6 as element 602.

One will appreciate in light of the disclosure herein that the use of an SDK function or an iframe are two examples of ways to render or call the checkout option. Embodiments of the present invention, however, are not limited to the use of an SDK function or an iframe. For example, in alternative web-based commerce application embodiments, instead of using an iframe, the network application 218/e-commerce payment facilitator 106a can pass the payment information to the commerce application 104a, which can then render the payment information.

More particularly, rather than a plug-in software application that operates or executes in the context of a browser (e.g., a web browser) or other application client that consumes structured documents, the functionality described herein can be incorporated directly into a browser client application, as opposed to being a plug-in. For example, the open graph protocol enables any web page to integrate into the social graph. In particular embodiments, the presence of basic metadata within the structured document allows objects within the structured document to become graph objects or nodes. In order to turn web pages into graph objects, open graph protocol <meta> tags and the checkout option 314 (and/or payment information) are included in the web page. The open graph protocol defines four properties: title, type, image, url.

In still further embodiments, XFBML or HTML5 may be used to implement, render, or call the checkout option 314 (and/or payment information). XFBML and HTML5 may require that the page make a call to a Javascript SDK, may be added to the code. In particular embodiments, the Javascript SDK enables a web page to access some or all of the payment information and/or the checkout option 314. Still further the commerce application 104a can use the Javascript SDK to listen to events so that the commerce application 104a knows in real time when someone clicks or otherwise selects the checkout option 314.

Thus, one will appreciate that the checkout option 314 (and/or payment information) can be implemented, rendered, or called using any number of methods or protocols. Examples of such methods and protocols are described in more detail in U.S. patent application Ser. No. 13/116,945, filed on May 26, 2011, entitled "Social Data Inputs" in the content of a "Like Button." The entire contents of the foregoing application are hereby incorporated by reference in their entirety.

Upon the user selecting the checkout option 314, a request can be sent to the network application 218 for payment information 316. Or in other words, an indication can be sent to the e-commerce payment facilitator 106a that the user has selected to complete the purchase using the network application 218.

For example, in one or more embodiments (such as when the commerce application 104a comprises a native application) the commerce application 104a can make a call to a graph API of the network application 218 seeking the payment information for the user 102. The graph API call seeking payment information can originate from the client device 202 running the commerce application 104a and can include the user identifier previously obtained at step 308. Alternatively, the graph API call seeking payment information can originate from the server computing device 214 running the commerce application 104a. In still further embodiments, the user networking application 236 (i.e., a native SNS application on the mobile device) can make the call to the network application 218 seeking the payment information for the user 102. Additionally, the graph API call can optionally include the app access token or pre-agreed secret code. In one or more embodiments, the commerce application 104a can include detailed information about items the cart discussed above in relation to step 310 in the graph API call.

In alternative embodiments, (such as when the commerce application 104a comprises a web application) the web browser 204 can execute a widget that causes the web browser 204 to send a request to the network application 218 seeking payment information. The web browser 204 can identify one or more parameters from the widget and send the one or more parameters to the network application 218 with the facilitator engagement request 402. The one or more parameters can comprise the identification of the commerce application 104a (i.e., the app access token or pre-agreed secret code), an amount of the items/services in the virtual cart, a cookie to authenticate the user as described herein.

In response to the request for the payment information 316, the network application 218 can use the ID to identify payment information of the user 102 stored by the payment profile storage module 224 and/or to identify a user node stored by the node storage module 220 for the user. When the user ID comprises an obfuscated user identifier, the network application 218 can transform the user ID into a non-obfuscated user identifier using a transformation function, which includes but is not limited to the application of a symmetric key cryptographic function to the obfuscated user identifier, the application of a public-key (asymmetric key) cryptographic function to the obfuscated user identifier, or the comparison of the obfuscated user identifier to a list of obfuscated user identifiers mapped to non-obfuscated user identifiers.

The e-commerce payment facilitator 106a can provide a response 318 including any available payment information for the user. The payment information can comprise any available information for the following: a name (e.g., first, middle, last), an expiration date (year and/or month) of the payment card, a billing address (including street name, house number, city, state or province, zip code, country, etc.) associated with the payment card, a phone number associated with the payment card, and one or more shipping addresses (including similar fields as the billing address). The e-commerce payment facilitator 106a will not provide the commerce application 104a with the payment card number of the user. Instead, the e-commerce payment facilitator 106a will provide a payment card label (i.e., "X's" for all of the digits of the payment card except the last for digits) and a payment token generated by the token generator 234.

The payment token as explained below may be required by the e-commerce payment facilitator 106a prior to processing a payment. The payment token can be specific to the commerce application 104a, user, amount and/or cart specific (i.e., valid only for a specific commerce application, user, amount and/or cart). In still further embodiments, the payment token can be specific to a user/commerce application combo. The e-commerce payment facilitator 106a can also associate any number of different use parameters. For example, the payment token can be a single use token. Thus, once used once, the payment token can become invalid. Additionally, the e-commerce payment facilitator 106a can assign the payment token a window of validity (e.g., 10 minutes, 1 hour, 1 day) after which the payment token becomes invalid. Still further, e-commerce payment facilitator 106a can optionally assign the payment token a time-to-live. The e-commerce payment facilitator 106a can tie the detailed cart information to the payment token. This can help ensure that the payment token is only valid for the purchase of the cart. Additionally, this can allow the e-commerce payment facilitator 106a to know if the purchase of the cart is completed or not.

As part of indicating 316 that the user desires to use the network application 218 to complete the checkout process or as an additional step, the commerce application 140a can issue a TOS API call to the e-commerce payment facilitator 106a seeking an indication of whether the user 102 has permitted the network application 218 to provide the payment information of the user 102 to the commerce application 104a. The e-commerce payment facilitator 106a can check its permissions stored in the TOS module 235. If the user has provided authorization to allow the commerce application 104a to access the payment information, the e-commerce payment facilitator 106a can provide the payment information, payment token, and card label 318 as described above.

If the user has not provided authorization to allow the commerce application 104a to access the payment information, the process may continue by seeking permission from the user. In particular, a permissions user interface can provide the user with the option of granting the commerce application 104a access to the payment information stored by the network application 218. The permissions user interface may be provided by an operating system of the computing device 202 or through a user interface element within the user network application 202. If the user grants permission, the e-commerce payment facilitator 106a can update its permissions with the TOS module 235 and provide the payment information, payment token, and card label 318 as described above.

Optionally, as indicated by 320, the e-commerce payment facilitator 106a can send an authorization request against the payment card of the user for the amount of the cart to the payment gateway system 108. The payment gateway system 108 can forward the authorization request along through a payment network (e.g., payment network 116, as shown in FIG. 1), which can approve or deny payment card authorization. The payment gateway system 108 can then forward the payment card authorization response to the e-commerce payment facilitator 106a, as indicated by 322. One will appreciate that the optional authorization request can take place earlier or later in the timeline. In alternative implementations, the e-commerce payment facilitator 106a can send an authorization request against the payment card of the user for the amount of the cart to the payment gateway system 108 as part of the send charge request 328. Similarly, payment gateway system 108 can then forward the payment card authorization response to the e-commerce payment facilitator 106a as part of the send payment charge request 330.

In one or more embodiments, upon receiving the payment information and payment card label from the e-commerce payment facilitator 106a, the commerce application 104a can render a checkout screen with the payment info received from the e-commerce payment facilitator 106a. For example, the commerce application 104a can auto-fill the payment fields of a checkout screen with any payment information received. One will appreciate in light of the disclosure herein that the e-commerce payment facilitator 106a may not have information for each of the payment fields of the commerce application 104a checkout screen, or may include outdated information. In such instances, the user can change the auto-filled information in one or more payment fields or add information in any blank payment fields.

In alternative embodiments (such as when the commerce application 104a comprises a web application) when executing the widget described above, the web browser 204 can create a frame (e.g., an iframe). The response 318 to the request for payment information 316 can include content for inclusion in the frame (i.e., the payment info and the card label). The web browser 204 then renders the checkout screen (which comprises or includes the frame) using the information received in the response 318 from the e-commerce payment facilitator 106a (and in some embodiments information generated by the commerce application) and displays the checkout screen and the frame, with the information from the e-commerce payment facilitator 106a displayed in the frame. By including the widget in the markup language document describing a web page of the commerce application 104a, payment information from the e-commerce payment facilitator 106a can be displayed along with the web page. In such embodiments, the commerce application 104a does not auto-fill the payment fields, but rather renders the payment information when the commerce application 104a renders the frame.

Upon the commerce application 104a rendering the checkout screen with the payment information in the payment fields, the user can confirm the purchase of the order 326 or otherwise complete the transaction in as little as a single click or user input. For example, when the e-commerce payment facilitator 106a provides information for each of the required payment fields, the user can select a "pay" or "order" button or other selectable option to complete the transaction. In alternative embodiments, the user may be required to complete one or more payment fields for which data was not supplied or otherwise perform additional operations to complete the transaction.

Upon the user confirming the order 326, the commerce application 104a can send a charge request 328 to the e-commerce payment facilitator 106a. In particular, the commerce application 104a can make a call to a payment API of the network application 218 that includes the charge request. The charge request can include the payment token previously provided to the commerce application 104a and a confirmation that the user has selected to complete the transaction. Alternatively or additionally, the charge request can include an order ID that identifies or maps to the cart information. Still further, the charge request can include the user ID obtained in step 308 and/or the app access token or pre-agreed secret code.

Optionally, the charge request can further include any of the cart information previously described in relation to step 310. For example, one or more details of the order (including, but not limited to, any of the payment information described above, the obfuscated user identifier, a transaction number of the commerce application and/or the network application, a monetary amount to be charged to the user, an identifier of the commerce application, etc.) are transmitted to the e-commerce payment facilitator 106a as part of a charge request. One will appreciate in light of the disclosure herein that when the payment information is sent with the charge request, the e-commerce payment facilitator 106a can determine if the user updated or added any information to the provided payment information. If the user added or changed any information, the e-commerce payment facilitator 106a can update the payment profile of the user stored in the profile storage module 228. In one or more embodiments, the user can provide authorization to update their payment profile with e-commerce payment facilitator 106a prior to the e-commerce payment facilitator 106a storing any of the added/changed information.

In one or more implementations of the present invention, the e-commerce payment facilitator 106a can require that the call to the payment API of the network application 218 including the charge request originates from the server computing device 214 running the commerce application 104a and is directed to the server computing device(s) 216 running the network application 218. One will appreciate in light of the invention herein that requiring a server-to-server call can increase the security of the transaction.

Upon receiving the charge request the e-commerce payment facilitator 106a can retrieve the payment card information from the profile storage module 228 using the payment token received in the charge request. The e-commerce payment facilitator 106a can then identify the payment gateway system chosen using the payment gateway ID module 230 described above. Alternatively, the charge request can include an indication of the payment gateway system to which the payment charge request should be sent. The e-commerce payment facilitator 106a can then send a payment charge request 330 to the selected payment gateway system 108. The payment charge request can include the full payment card number of the user, an expiration date of the payment card, billing/shipping address of the user, an indication of the commerce application 104a (e.g., a MID or other identifier), and an indication of authorization to submit charge requests on behalf of the commerce application 104a. The indication of authorization can comprise encoding one or more portions of the request using the private key provided to the commerce application 104a by the payment gateway system 108, a secret key or other identifier, or another indication that signals to the payment gateway system 108 that the e-commerce payment facilitator 106a is acting on behalf of the commerce application 104a (or merchant).

The payment gateway system 108 can process the payment charge request using the payment network 116 as described above in relation to FIG. 1. The payment gateway system 108 can return a transaction ID and a charge response to the e-commerce payment facilitator 106a as indicated by 332. The transaction ID can allow the payment gateway system 108 to update the e-commerce payment facilitator 106a or the commerce application 104a with updates regarding the transaction (funded, denied, returns, etc.). The e-commerce payment facilitator 106a can then forward the transaction ID 334 to the commerce application 104a. The transaction ID can allow the commerce application 104a to query the payment gateway system 108 regarding the transaction if necessary.

One will appreciate in light of the disclosure herein that the monetary amount in the payment charge request can be credited to an account of the commerce application 104a directly from the payment network 116, and not from an account of the network application 218 or the e-commerce payment facilitator 106a. Thus, from the perspective of the commerce application 104a, the financial result can appear as if the user had completed the checkout process utilizing a preexisting checkout system of the commerce application 104a (i.e., funds can be deposited into the same account from the components of the payment network 116). Additionally, the commerce application 104a can benefit from the quicker and easier authentication and checkout provided by the e-commerce payment facilitator in terms of decreased "abandoned" shopping carts and happier users.

The diagram of FIGS. 3A-3B illustrates an embodiment in which the commerce application 104a always displays the option to checkout using the network application 218 (i.e., the e-commerce payment facilitator 106a). The present invention, however, is not so limited. In alternative embodiments, the e-commerce payment facilitator can intelligently and dynamically provide the option to use stored payment information. For instance, the option can be provided when the option will likely increase the likelihood of the user completing a purchase or transaction. Furthermore, when the option to use stored payment information will not likely increase the likelihood of a purchase, the option may not be provided. One will appreciate in light of the disclosure herein that a dynamically placed option to use the e-commerce payment facilitator 106a can reduce graphical interface clutter, which can be at a premium in mobile commerce applications.

Figure 4:
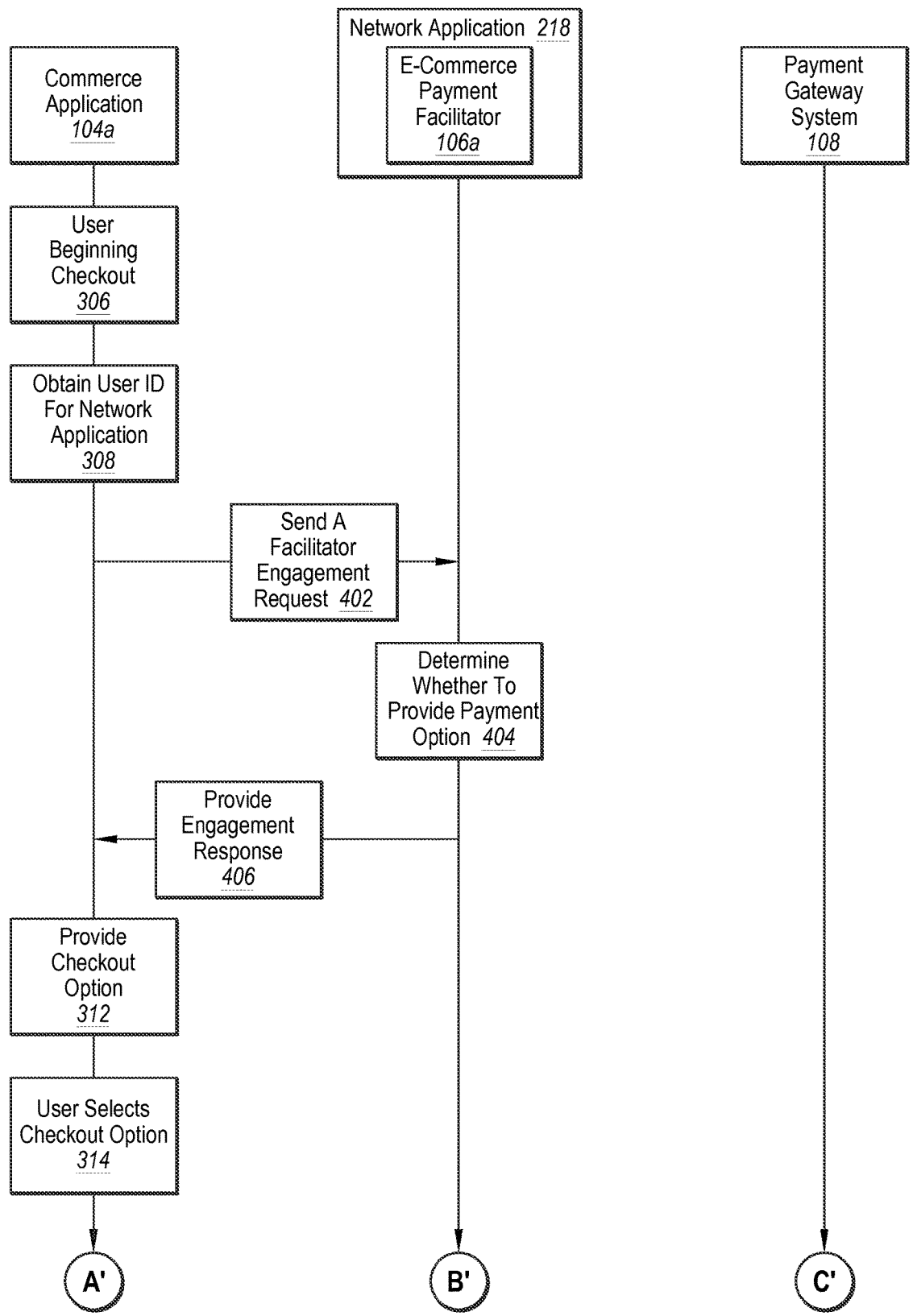
FIG. 4 is a sequence-flow diagram illustrating a method of dynamically providing an option to use payment information stored by the network application in accordance with one or more embodiments of the present invention.

FIG. 4 illustrates a sequence-flow diagram similar to the diagram of FIGS. 3A and 3B. The sequence-flow diagram of FIG. 4 illustrates an embodiment of providing a dynamic option to use the e-commerce payment facilitator 106a to complete a transaction using the commerce application 104a. The sequence-flow diagram of FIG. 4 includes many of the steps and components described above in relation to FIGS. 3A and 3B. For the sake of brevity, these steps are not described again in detail in relation to FIG. 4. One will appreciate, however, that the descriptions of these steps provide in relation to FIGS. 3A and 3B can equally apply to FIG. 4.

FIG. 4 illustrates that the user can begin a checkout 306 at the commerce application 104a, as described above. The commerce application 104a can then obtain the user ID 308 for the network application, as described above. One will appreciate that the step of obtaining the user ID for the network application can occur after the user begins the checkout. Alternatively, the commerce application 104a can obtain the user ID for the network application before the user begins the checkout process.

As shown, the commerce application 104a can send a facilitator engagement request 402 to the network application 218. For example, when the commerce application 104a comprises a native application, the facilitator engagement request can be an API call from the client side or server side commerce application 104a. The facilitator engagement request can include the user ID, an identification of the commerce application 104a (i.e., the app access token or pre-agreed secret code), and an amount of the items/services in the virtual cart.

Alternatively, when the commerce application 104a comprises a web application, the web browser 204 can execute a widget that causes the web browser 204 to send a facilitator engagement request 402 to the network application 218. The web browser 204 can identify one or more parameters from the widget and send the one or more parameters to the network application 218 with the facilitator engagement request 402. The one or more parameters can comprise the identification of the commerce application 104a (i.e., the app access token or pre-agreed secret code), and an amount of the items/services in the virtual cart.

In one or more embodiments, the facilitator engagement request (whether an API call or a request sent from the web browser) can also include detailed information about the items in the cart. For example, the cart information can comprise a JSON encoded array of cart items. Each JSON object in the array can comprise one or more of a name of the item, an amount of the item, the quantity of the item, and a URL of the open graph product that the user desires to purchase.

In one or more embodiments the facilitator engagement request 402 to the network application 218 can include an indication of an average conversion rate (percentage of users who purchase items entered into a virtual cart) for the commerce application 104a. By providing the average conversion rate as part of the facilitator engagement request, the commerce application 104a can ensure that the average conversion rate is current. Alternatively, the commerce application 104a can provide the conversion rate at step 304 or when setting up an account with the e-commerce payment facilitator 106a.

Upon receiving the facilitator engagement request, the network application 218 can intelligently and dynamically determine, as indicated by step 404, whether the commerce application 104a should provide an option to the user to use the e-commerce payment facilitator 106a to complete the checkout process. In making the determination, the network application 218 can use one or more of the following factors or a combination thereof: (1) whether the user has an account with the network application, (2) whether the user is currently logged into the network application, (3) the payment information (shipping address, billing address, etc.) available for the user; (4) whether a payment card is on file for the user; (5) conversion rate for the user when the e-commerce payment facilitator option is used with the commerce application 104a or other commerce applications; (6) past purchases of the user; (7) demographic information available from the social-networking system 220 for the user (age, gender, etc.); (8) a history of activity for the user with the network application 218a, including but not limited to whether the user 102 has utilized the e-commerce payment facilitator 106a before for other purchases using the same commerce application 104a or for other purchases using different commerce applications; (9) interests of the user as indicated by the social-networking system 220; (10) a risk score for the user; or other information or factors.

In one or more embodiments, the determination whether to provide an option to the user to use the e-commerce payment facilitator 106a can be based on all of the foregoing factors for which data is available. In other embodiments, one, two, three, four, five, six, seven, eight, or nine of the factors can be used in making the determination 404. Additionally or alternatively, the e-commerce payment facilitator 106a can weigh one or more of the factors more than other factors. The weight applied to the factors can be commerce application specific, user specific, or based on another determination.

In one embodiment, the network application 218 can determine that the commerce application 104a should provide an option to use the e-commerce payment facilitator 106a only if the user has an account with network application 218, as determined using the user ID provided with the facilitator engagement request 402. For example, when the commerce application 104a is a web application, the network application 218 can check the computing device 202 for a cookie. In response to the network application 218 checking for the cookie, the computing device 202 can send the cookie, or a message associated with the cookie, to the network application 218. As mentioned above, in one or more embodiments, the existence of cookie can indicate whether the user 102 of the computing device 202 is a user of the network application 218 (e.g., whether the user has a valid account with the social networking system 220). If the user 102 of the computing device 202 is a user of the network application 218, the cookie ay contain information indicating whether the user is logged into the network application 218 (e.g., whether the user has a current valid session with the social networking system 202). Checking the user device 202 for a cookie thus allows the network application 218 to authenticate the user session. In other embodiments, the network application 218 may just determine whether the user is a user of the network application 218, e.g., by checking for an existence of a cookie, without determining whether the user is logged into the network application 218. Although cookies are described herein for authenticating the user and/or the user session, any other methods of user or session identification or authentication may be used (such as recognizing a physical token). One will appreciate that the probability that the user will user the e-commerce payment facilitator 106a to complete a checkout if they do not have an account with the network application 218 may be low. Thus, by not providing a button or other selectable option to use the e-commerce payment facilitator 106a, the commerce application 104a can reduce user interface clutter.

Additionally or alternatively, the network application 218 can determine that the commerce application 104a should provide an option to use the e-commerce payment facilitator 106a only if the user is currently logged into the network application 218. The network application 218 can determine whether the user is logged in based on the user identifier sent with the facilitator engagement request. For example, the network application 218 can use the user identifier to map to a node in the social graph module corresponding to the user that indicates whether the user is logged in or not. Thus, in such implementations the presence of the user identifier (i.e., hash of user ID as describe above) in the facilitator engagement request can indicate that the user is currently logged into the network application 218. Alternatively, the commerce application 104a can only obtain the user identifier if the user is logged into the network application 218 as described above using a cookie.

In still further embodiments, the network application 218 can determine that the commerce application 104a should provide an option to use the e-commerce payment facilitator 106a if the network application 218 determines that providing the option will increase the probability that the user will complete the transaction. In particular, the e-commerce payment facilitator 106a can determine a predicted conversion rate for the user based on the commerce application 104a and one or more of the aforementioned factors. If the predicted conversion rate is greater than the average conversion rate provided by the commerce application 104a, the network application 218 can determine that the commerce application 104a should provide the option. If the predicted conversion rate is less than the average conversion rate provided by the commerce application 104a, the network application 218 can determine that the commerce application 104a should not provide the option.

For example, the average conversion rate provided by the commerce application 104a can comprise an integer between 0 and 100 that equates to a percentage of users of the commerce application 104a who have added an item or service to a cart and then have completed the purchase of the item or service. The predicted conversion rate can be equal to the percentage of times the user has completed a checkout when presented with the option to use the network application 218 using any commerce application; the percentage of times users of the network application 218 using any commerce application have completed a checkout when presented with the option to use the e-commerce payment facilitator 106a; the percentage of times users of the network application 218 using the commerce application 104a have completed a checkout when presented with the option to use the e-commerce payment facilitator 106a; the percentage of times users of a similar age, gender or other demographic common to the user have completed a checkout when presented with the option to use the e-commerce payment facilitator 106a; the percentage of times users having a similar amount of payment information have completed a checkout when presented with the option to use the e-commerce payment facilitator 106a; the percentage of times users having a payment card on file have completed a checkout when presented with the option to use the e-commerce payment facilitator 106, a combination of the foregoing percentages, or another percentage calculated using another heuristic. One will appreciate that the e-commerce payment facilitator 106a can leverage the information in the social graph module 222, the transaction database 232, and/or the profile storage module 228 to determine the predicted conversion rate.

Additionally, the determination of whether 218 providing the option to use the e-commerce payment facilitator 106a will increase the probability that the user will complete the transaction can be based upon the application of a decision model, wherein the decision model is generated by a machine learning algorithm. Accordingly, in an embodiment of the invention, the e-commerce payment facilitator 106a includes a machine-learning algorithm configured to create a decision model by analyzing actual uses of the e-commerce payment facilitator 106a by other users of the network application 218. For example, a machine learning algorithm may determine, based upon that other the e-commerce payment facilitator 106a uses, that users of a particular gender, within a particular age range, and shopping at a particular type of store are very likely to utilize payment information stored by the network application 218 while placing an order using the commerce application 104a. Of course, these metrics are merely illustrative; actual machine learning algorithms are able to continually determine different combinations of indicators describing a user and or order circumstance (time of day, type of commerce application 104a, etc.) to generate the decision model. In an embodiment, the decision model is a classifier.

As mentioned previously, one of the factors in making the determination of whether 218 providing the option to use the e-commerce payment facilitator 106a will increase the probability that the user will complete the transaction is a risk score for the user. The risk score can comprise a predication about how much risk there might be that the user 102 will not complete the order, will provide invalid payment information, will attempt to return the items, or perform another undesirable action. In an embodiment, the risk score is an integer between 0 and 100, and in another embodiment the risk score is a letter between 'A' and 'F', but in other embodiments other scales are utilized. The e-commerce payment facilitator 106a can calculate the risk score using a decision model generated by a machine-learning algorithm, similar to that described above in relation to the predicted conversion rate.

The risk score can be based on risk data associated with a payment card and risk data associated with the user. For example, the payment card risk factors can include whether the card is new, whether the card has been successfully used in the past, whether the user adds and removes cards often, whether there are lots of charge backs on the card, etc.). User risk factors can include a length of time that the user has had an account with the network application 218, how active the user has been using the network application 218, a number of friends and metadata describing the friends of the user (in an embodiment where the network application 218 comprises a social-networking system 220), such as whether other users wish the user happy birthday, whether the user sends and receives messages from other users, a number of photos of the user, a geo-location of the user or a device associated with the user, etc.

One will appreciate that the information associated with the social graph module 222 can allow the risk score to provide valuable insight into potential fraud or identify theft. For example, the risk score can be increased if the user has attempted to make a large number of purchases over a short period of time, has drastically changed a shopping pattern, is accessing the commerce application at a location different (based on IP address) from a current location (based on a check-in with the social-networking system), etc.

In one or more embodiments, the e-commerce payment facilitator 106a can determine to provide the option to use the e-commerce payment facilitator 106a if the risk score is above a threshold. The threshold can be based on an amount of the transaction. For example, if the transaction is a first monetary value, the risk threshold at which the e-commerce payment facilitator 106a will determine not to provide the option can be a first value. If the transaction is a second monetary value that is greater than the first monetary value, the risk threshold at which the e-commerce payment facilitator 106a will determine not to provide the option can be a second value that is less than the first value. In still further embodiments, the e-commerce payment facilitator 106a can return the risk score to the commerce application 104a and allow the commerce application 104a to make a determination whether to allow the user to complete the transaction.

As shown step 406 of FIG. 4, the e-commerce payment facilitator 106a can provide an engagement response to the commerce application 104a. The engagement response can indicate whether the commerce application 104a should provide the user with the option to complete a transaction using the e-commerce application 104a. For example, the e-commerce payment facilitator 106a can send a positive engagement response if providing the payment information will likely increase the probability that the user completes the purchase of the one or more items or services from the commerce application 104a. On the other hand, the e-commerce payment facilitator 106a can send a negative engagement response if providing the payment information will not likely increase the probability that the user completes the purchase of the one or more items or services from the commerce application 104a. In an embodiment, the engagement response includes a Boolean value (i.e., true or false) indicating whether or not the option to use the e-commerce payment facilitator 106a should be provided. Additionally or alternatively, the engagement response can include the risk score.

Based on the engagement response, the commerce application 104a can provide the checkout option 312 as described above in relation to FIG. 3A, provide a default checkout option that requires the user to enter all payment information, or deny checkout requests because the transaction is too risky based on the risk score. If the option to checkout using the e-commerce payment facilitator 106a is provided, the timeline flow of FIG. 4 can continue at step 314 of FIG. 3A.

In still further embodiments, intelligently and dynamically providing the option to use stored payment information can be used in connection with other payment methods/infrastructures other than that described hereinabove in relation to FIGS. 3A and 3B. In particular, in one or more embodiments the e-commerce payment facilitator 106a can act as a payment gateway system and forward payment information for the user directly to a payment processing system. In such implementations, an amount for the transaction can be credited to an account of the commerce application 104a directly from the network application 218 or the e-commerce payment facilitator 106a.

In light of the foregoing description, one will appreciate that the e-commerce payment facilitator 106a can provide a number of benefits over conventional commerce application payment processes and checkout processes. As discussed above, the e-commerce payment facilitator 106a can increase the ease and speed of a checkout process by providing payment information that can be auto-filled into the commerce application 104a. FIGS. 5A-5G illustrate user interfaces of a commerce application 104a checkout process that utilizes the e-commerce payment facilitator 106a.

In particular, the user interfaces of FIGS. 5A-5G may be presented by mobile device 500. The mobile device 500 is a mobile phone device. In additional or alternative examples, however, another mobile or non-mobile device, such as, but not limited to, a mobile phone device, a handheld device, a laptop computer, a personal-digital assistant device, and/or any other suitable device can present the user interfaces of FIGS. 5A-5G. Mobile device 500 may include and/or be associated with a touch screen 502 by way of which the user interfaces may be presented and/or by way of which user input may be received and/or detected. Additionally or alternatively, mobile device 500 may include any other suitable input device (e.g., a keypad, one or more input buttons, etc.). In some examples, a user may utilize touch screen 502 to provide one or more touch gestures, interact with the interfaces, and/or provide payment information.

Figure 5A:
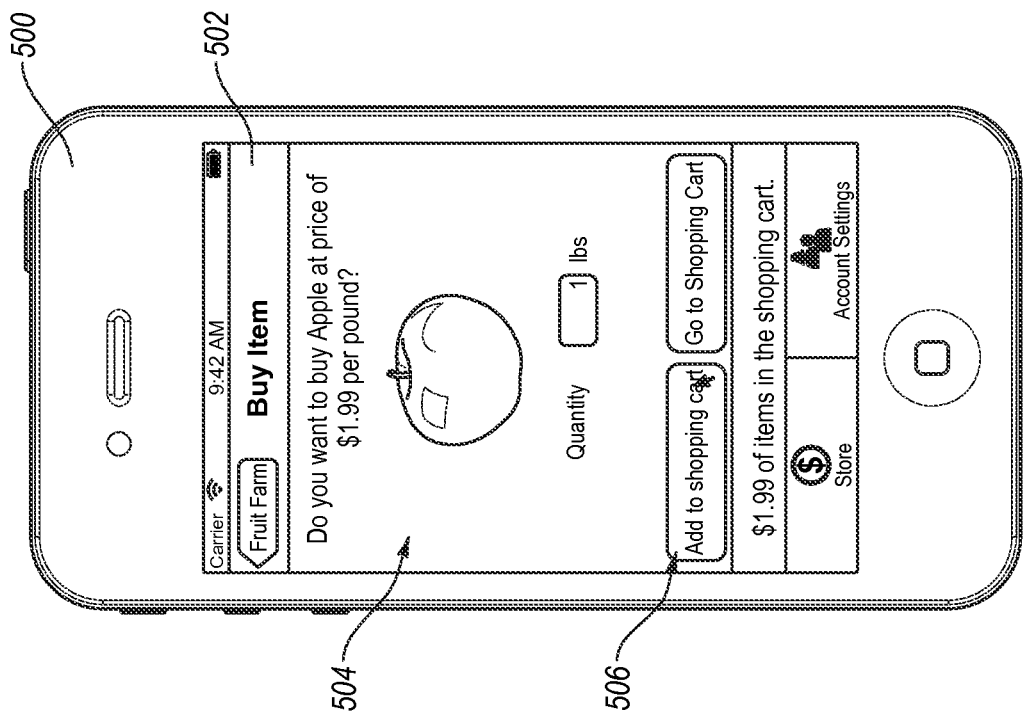

FIG. 5A illustrates a user interface 504 of a commerce application 104a that allows a user to select one or more goods or services to purchase. In particular, FIG. 5A illustrates that a user can select a pound of apples to purchase. Upon the user selecting a selectable option 506 (e.g., "Add to shopping cart" button), a second user interface 508 can be displayed as shown by FIG. 5B. The second or virtual cart user interface 508 can provide a view of a virtual shopping cart that lists the goods and/or services the user is desires to purchase. In this example, the virtual shopping cart, as shown in the second user interface 508 includes a pound of apples, taxes, and shipping and handling for a total of $7.17.

The second user interface 508 includes a user selectable element (e.g., button 510) operable by the user to "Check Out" (e.g., to complete the purchase of the items in the cart). Upon the user selecting the button 510, the commerce application 104a can send the user ID and cart information to the e-commerce payment facilitator 106a, as described above in relation to FIG. 3A.

Alternatively, upon the user selecting the checkout button 510, the commerce application 104a can send the facilitator engagement request 402, as described above in relation to FIG. 4. In return, the e-commerce payment facilitator 106a can determine whether to provide the option 404 to use information stored by the e-commerce payment facilitator 106a to compete the checkout of the virtual cart. In this particular embodiment, the e-commerce payment facilitator 106a provides an engagement response 406 that is positive (indicating that the commerce application 104a should provide the option) or negative (indicating that the commerce application 104a should not provide the option).

In response to the engagement response 406, the commerce application 104a can render a checkout user interface 512 as shown in FIG. 5C. The checkout user interface 512 can include a plurality of payment fields 513 into which payment information can be entered for the user. The checkout user interface 512 can also include a selectable checkout option 514 including a glyph (i.e., a mark, icon, graphic, portion of text, etc.) indicating that the user may utilize the e-commerce payment facilitator 106a associated with the network application 218 to complete the purchase of the items in the virtual cart of the commerce application 104a. In the shown embodiment, the glyph comprises a FACEBOOK™ icon.

As shown by FIG. 5C, in at least one embodiment, the selectable checkout option 514 can comprise a selectable overlay that covers a portion of the checkout user interface 512. The commerce application 104a can call an SDK function that renders the overlay selectable checkout option 514. One will appreciate in light of the disclosure herein that the overlay selectable checkout option 514 can provide a number of advantages. For example, the overlay selectable checkout option 514 can animate in over the checkout user interface 512. This can provide notification to the user that the overlay selectable checkout option 514 is separate from the commerce application 104a, make the overlay selectable checkout option 514 more noticeable, and otherwise help increase a selection rate of the overlay selectable checkout option 514. In alternative embodiments, the selectable checkout option 514 can comprise a plug-in, a pop-up, an embedded button, or other selectable option instead of an overlay.

FIG. 5C illustrates that the selectable checkout option 514 can include a cancel or minimize selectable option 516 (shown in FIG. 5C as an "x"). When the user prefers not to complete the checkout process with the network application 218, the user can select the cancel or minimize selectable option 516. Upon selection of the cancel or minimize selectable option 516, the overlay selectable checkout option 514 can minimize into a selectable icon or other element 518, as shown in FIG. 5D. In particular, FIG. 5D illustrates that the selectable icon 518 can comprise a pencil icon. When the user selects the selectable icon 518, the selectable checkout option 514, as shown by FIG. 5C can reappear, maximize, or otherwise open. Once the user selects the selectable checkout option 514, the commerce application 104a can provide the indication of the selection of the checkout option 316 as described above in relation to FIG. 3B.

If the engagement response 406 is negative, the commerce application 104a can provide the checkout user interface 512 without the selectable checkout option 514 to complete the order using information from the network application 218. In such embodiments, the user may need to enter information into the payment fields 513 manually to complete the purchase of the order.

Figure 5E:
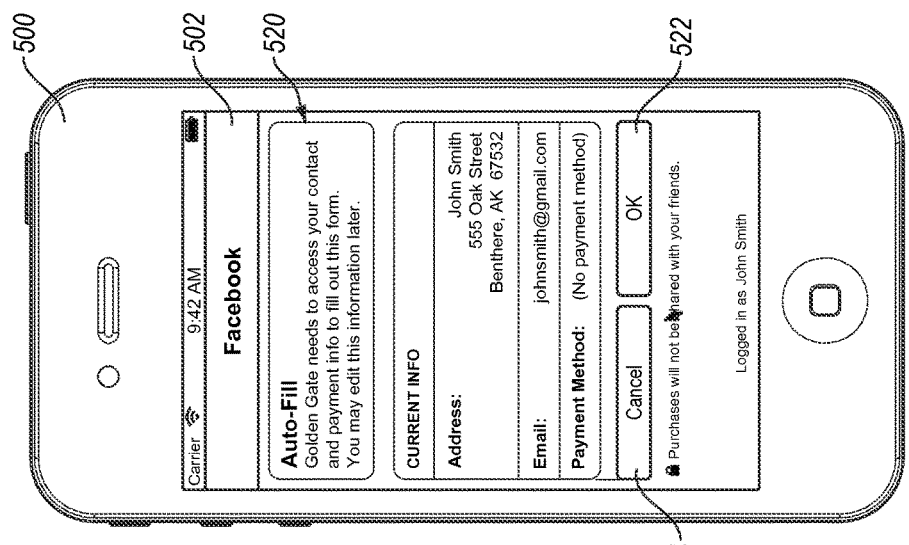
Figure 5D:
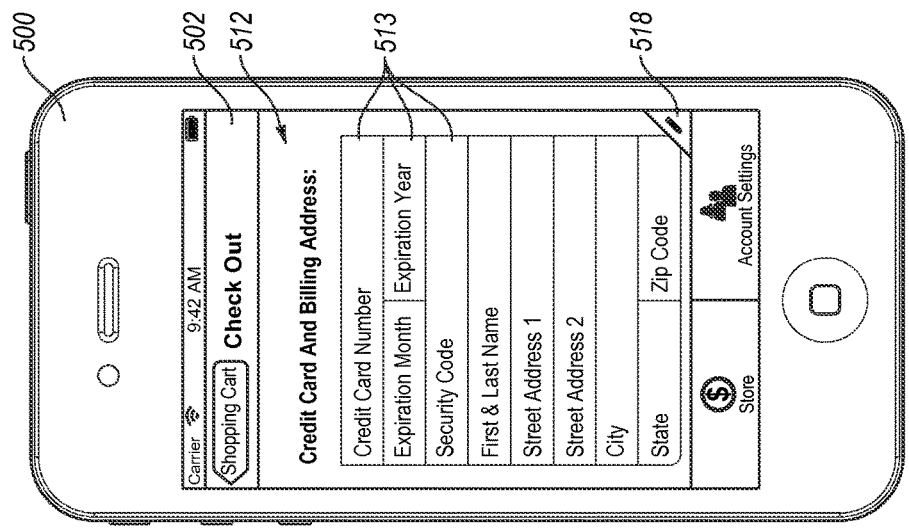

At this point, if the user has not already provided authorization to the commerce application 104a to receiving payment information from the network application 218/e-commerce payment facilitator 106a, a permissions user interface 520 can be presented to the user, as shown by FIG. 5E, to obtain permission from the user as to share payment information with the commerce application 104a. As shown by FIG. 5E, the permissions user interface 520 can be an interface of the network application 218 (in this case FACEBOOK™). Thus, an application switch can occur in order to present the permissions user interface 520. In alternative implementations, the permissions user interface 520 can comprise an overlay, pop-up, or an interface of the commerce application 104a such that an application switch is not necessary. Still further in implementations in which the commerce application 104a comprises a web-based application, the permissions user interface can comprise a plug-in, an iframe, a pop-up or other interface. For example, an iframe can be used on commerce application 104a to prompt the user to share his/her payment information with commerce application 104a. Through the iframe, the user networking application 236 (i.e., a native SNS application on the mobile device) can present the permissions UI 520. Upon the user granting permission to share payment information with the commerce application 104a, the user networking application 236 can make a call to the network application 218 to fetch the payment information, which is then auto-filled or otherwise entered into checkout UI of the commerce application 104a. In another embodiment, the commerce application 104a, rather than the user networking application 236, can make the call to network application 218 to request the payment information.

Referring again to FIG. 5E, the permissions user interface 520 can provide a selectable option 522 to grant permission to the network application 218 to provide the user's payment information to the commerce application 104a. The permissions user interface 520 can further include a selectable option 524, which the user can select to deny the commerce application 104a access to the user's payment information.

Figure 5G:
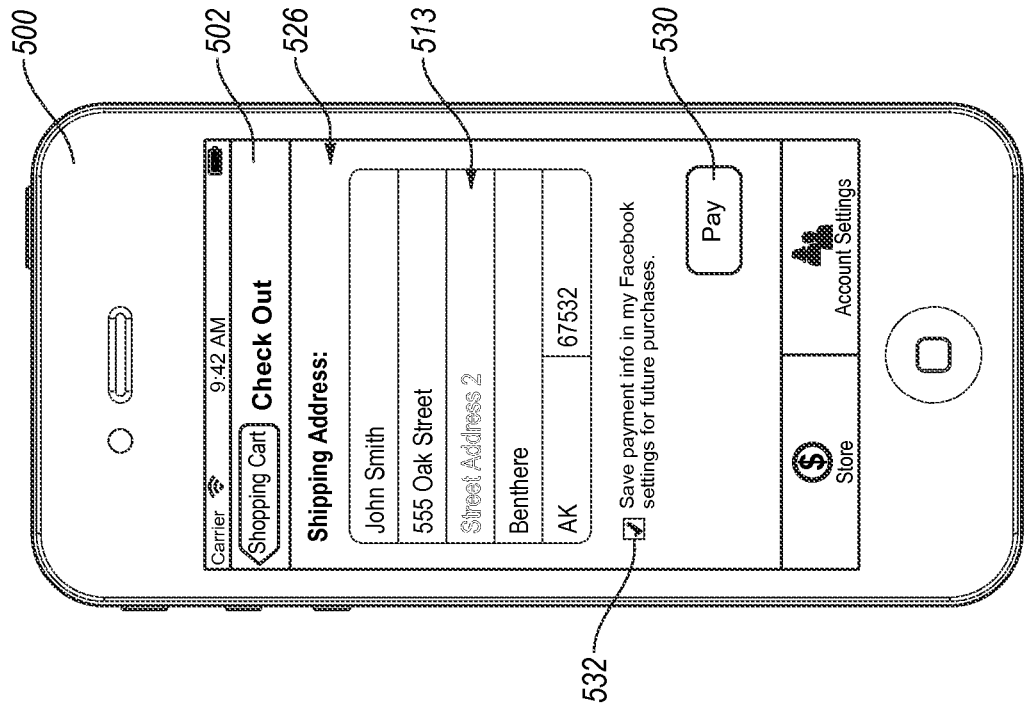
Figure 5F:
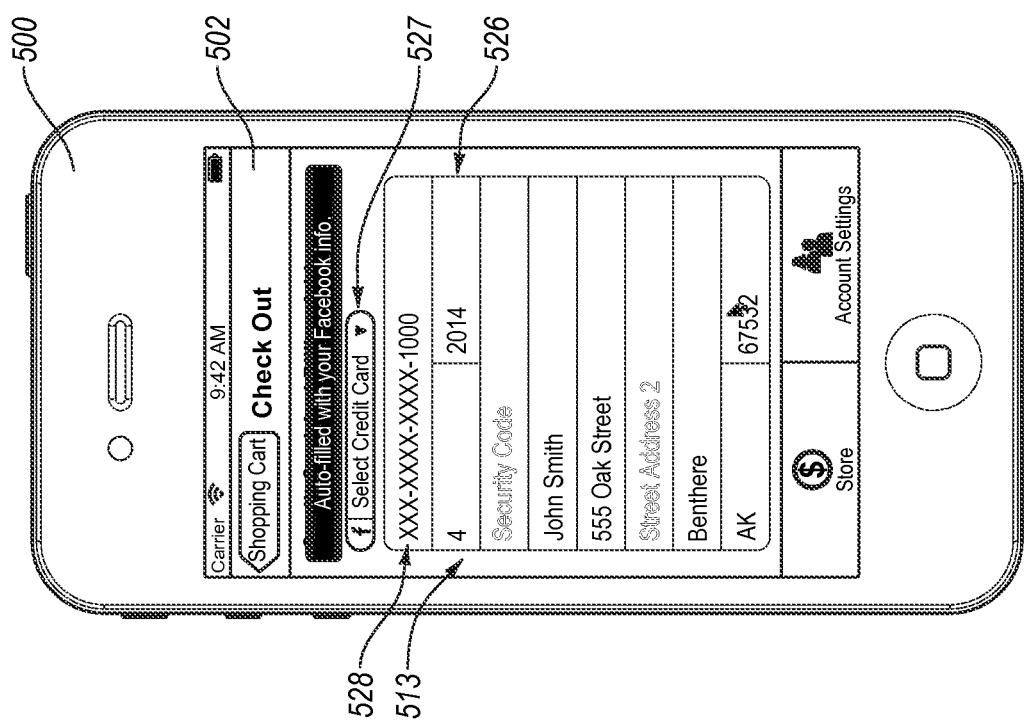

Upon the user selecting the selectable option 522 to grant permission to the network application 218 to provide the user's payment information to the commerce application 104a, the e-commerce payment facilitator 106a can provide the payment information, payment token, and card label (via the graph API call described above) to the commerce application 104a. The commerce application 104a can display a checkout user interface 526 as shown in FIGS. 5F and 5G auto-filled with the payment information of the user received from the e-commerce payment facilitator 106a. One will appreciate that a second application switch can occur from the network application 218 back to the commerce application 104a after the user selects the selectable option 522 in order to display the checkout user interface 526. If the user had previously provided permission for the network application 218 to provide the commerce application 104a with the user's payment information, directly after the user selects the selectable checkout option 514.

The checkout user interface 526 can include payment fields 513 auto-filled with the user's payment information, including the payment card label 528. The checkout user interface 526 can further include a payment cart selector 527. This can allow the user to select a payment card from amount a plurality of payment cards stored for the user by the e-commerce payment facilitator 106a. The checkout user interface 526 can further include a selectable pay option 530. When the user selects the selectable pay option 530 in order to confirm purchase of the order, the commerce application 104a can send a charge request to the e-commerce payment facilitator 106a as described above.

FIG. 5G further illustrates that the checkout user interface 526 can comprise an option to save payment information 532 to the network application 218 (in this instance FACEBOOK™). This can provide permission to the network application 218 to save any updates or payment information that the user adds/changes in the checkout user interface 526. For example, in one or more implementations the e-commerce payment facilitator 106a may only have name and address information for the user. Thus, even after auto-filling the payment fields 513 with the payment information provided by the e-commerce payment application 106a, the user will still need to enter information for a payment card. When the option to save payment information 532 is selected, the payment card information entered by the user into the checkout user interface 526 will be saved to the user's profile with the network application. This can allow the e-commerce payment facilitator 106a to provide this payment card information on subsequent purchases using the commerce application 104a or another commerce application.

One will appreciate in light of the foregoing disclosure that the e-commerce payment facilitator 106a can greatly increase the ease of making a purchase from a commerce application 104a. By increasing the speed and ease of the checkout process, the e-commerce payment facilitator 106a can help increase purchases and decrease abandoned carts. In addition, one or more embodiments of the present invention further provide for recapturing of abandoned carts. In particular, users often may not be able to complete the purchase of items in a cart due to a lack of time, a loss of a network connection, or other reasons. One or more embodiments can provide a user the opportunity to purchase the items in an abandoned cart at a later time. This can save the user the hassle of having to reenter items/services into a cart, can serve as a reminder to the user, and can allow a merchant to recapture abandoned carts.

More specifically, when the e-commerce payment facilitator 106a receives the detailed cart information from commerce application 104a (see e.g., step 316), the e-commerce payment facilitator 106a can store the detailed information in the transaction database 232 as an un-completed transaction. If the user completes the transaction, the e-commerce payment facilitator 106a can mark the transaction as complete in the transaction database. If the transaction is not completed (i.e., the e-commerce payment facilitator 106a never receives a charge request with the applicable payment token or the payment card is denied), the network application 218 can provide the user with another opportunity to complete the purchase of the items in the cart.

In particular, when the network application 218 comprises a social network, the network application 218 can send a purchase message to the user. For example, FIG. 6 illustrates an exemplary purchase message 600 included in a newsfeed for the user. In alternative implementations, the network application 218 can send the purchase message 600 to the user via text message, email, or other form of communication enabled by the network application 218. The complete the purchase message 600 can include details of items in the cart that was abandoned (name of items, price of items, etc.). The purchase message 600 can further include an indication of the commerce application 104a and the time the purchase of the cart was attempted. The purchase message 600 can further include a selectable buy option (such as the buy button 602 shown in FIG. 6) that allows the user to complete the abandoned transaction.

More specifically, upon the user selecting the selectable buy option 602, a deep link can be activated that directs the user to the virtual cart user interface 508 (see FIG. 5B) from which the user can complete the purchase of the items in the cart. In such implementations, the commerce application 104a can provide an indication to the e-commerce payment facilitator 106a of a length of time for which the cart is valid. This information can be included in the graph API call described above.

Alternatively, the selection of the selectable buy option 602 can allow the user to complete the purchase of the items directly from the network application 218 without having to be redirected to the commerce application 104a. In such embodiments, the network application 218 can complete the transaction using stored payment information for the user. The network application 218 can provide the user with the option of completing a transaction previous abandoned by the user.

Additionally or alternatively, the network application 218 can associate the items in abandoned or complete carts with a profile of the user. This information can then be used to present the user with targeted advertising to similar goods or services offered by the merchant of the commerce application or similar merchants.

FIGS. 1-6, the corresponding text, and the examples, provide a number of different systems and devices for facilitating purchases of commerce applications. In addition to the foregoing, embodiments of the present invention also can be described in terms of flowcharts comprising acts and steps in a method for accomplishing a particular result. For example, FIGS. 7-10 illustrate flowcharts of exemplary methods in accordance with one or more embodiments of the present invention.

Figure 7:
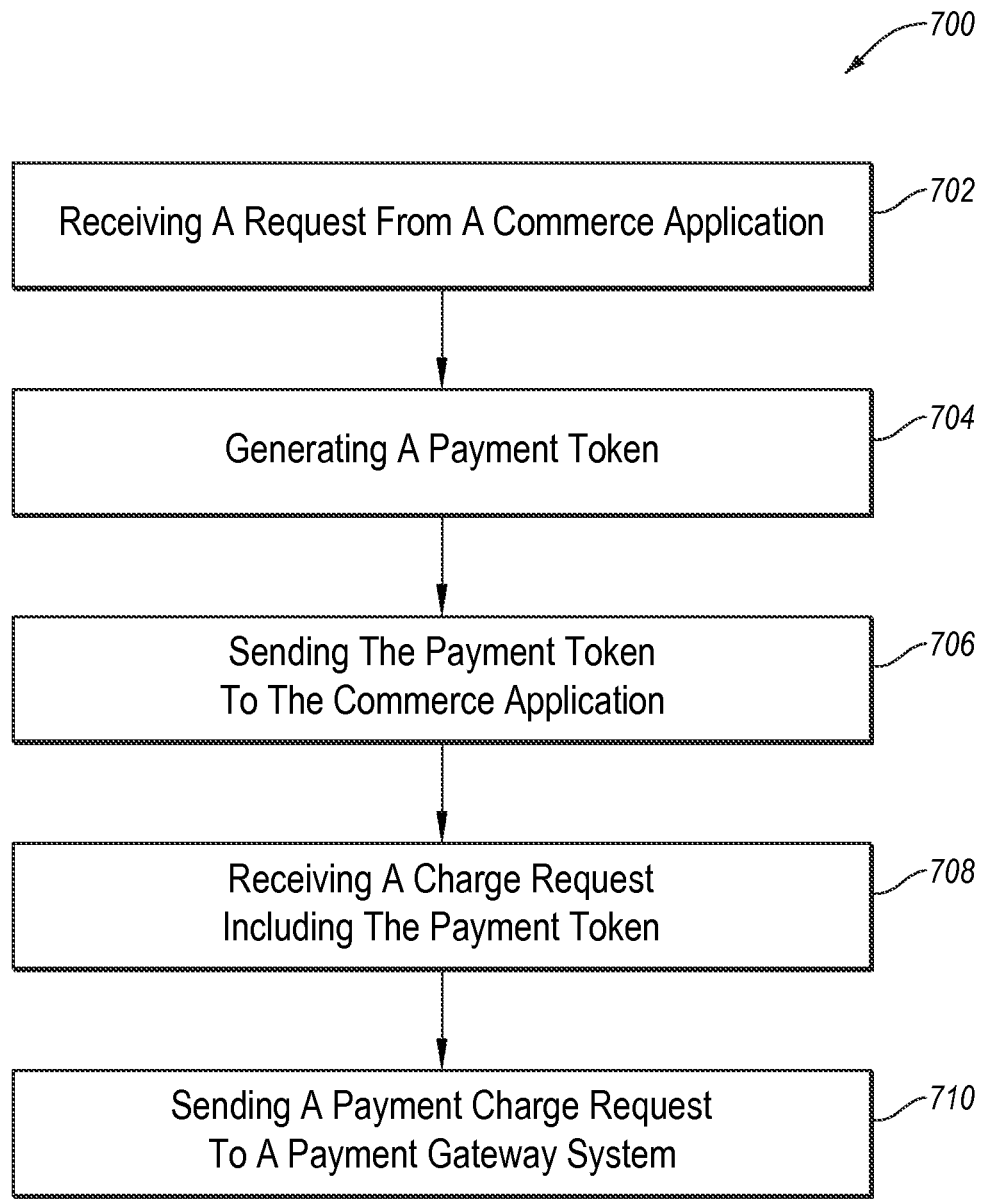
FIG. 7 illustrates a flowchart of a series of acts in a method of facilitating a financial transaction at a commerce application in accordance with one or more embodiments of the present invention.

FIG. 7 illustrates a flowchart of one exemplary method 700 of facilitating a purchase at a commerce application from the perspective of an e-commerce payment facilitator 106a or network application 218. The method 700 can include an act 702 of receiving a request from a commerce application. In particular, act 702 can comprise receiving a request 316 from a commerce application 104a. The request 316 can comprise a user identification of a user and a charge amount for one or more items or services selected for purchase from the commerce application 104a. In one or more embodiments, receiving the request 316 can comprise receiving a client-side graph API request (i.e., an API call from computing device 202 or device 500) that seeks payment information for the user to allow for auto-filling of one or more payment fields 513.

The method 700 may also include an act 704 of generating a payment token. In particular, act 704 can involve generating a payment token that references payment card details for the user stored in a non-transitory storage medium. More specifically, a token generator 234 of a server computing device(s) 216 can generate the payment token to reference one or more payment card numbers stored in the profile storage module 228 of the e-commerce payment facilitator 106a.

One will appreciate that the method 700 can further include mapping the identification of the user to a user ID of a user of the network application 218. This can allow the e-commerce payment facilitator 106a to identify the profile of the user stored in the profile storage module 228. In one or more embodiments, mapping the identification of the user an involve applying a transformation function to the identification of the user 102.

FIG. 7 further illustrates that the method 700 can include an act 706 of sending the payment token to the commerce application. More specifically, act 706 can involve the server computing device(s) 216 sending the payment token to the commerce application 104a in a response 318 to the client-side graph API request. In addition to sending the payment token, the response 318 can further include payment information for the user 102 and a payment card label 528.

The method 700 can additionally comprise an act 708 of receiving a charge request including the payment token. In particular, act 708 can involve receiving a charge request 328 including the payment token from the commerce application 104a. For example, act 708 can involve receiving a server-side payment API request from the server computing device 214. More specifically, act 708 can optionally involve verifying that the charge request 328 originated from the server computing device 214 associated with the commerce application 104a.

In addition to the foregoing, the method 700 can include an act 710 of sending a payment charge request to a payment gateway system. Specifically, act 710 can involve sending, by the server computing device(s) 216 executing the network application 218, a payment charge request 330 to a payment gateway system 108 associated with the commerce application 104a. The payment charge request 330 can comprise the payment card details (i.e., number and expiration date), the charge amount, and an indication of authorization to submit charge requests on behalf of the commerce application 104a. The indication of authorization can comprise encrypting at least a portion of the payment charge 330 request using a private key provided to the commerce application 104a from the payment gateway system 108 or one of the other methods of indicating that the e-commerce payment facilitator 106a is acting on behalf of the commerce application 104a.

Figure 8:
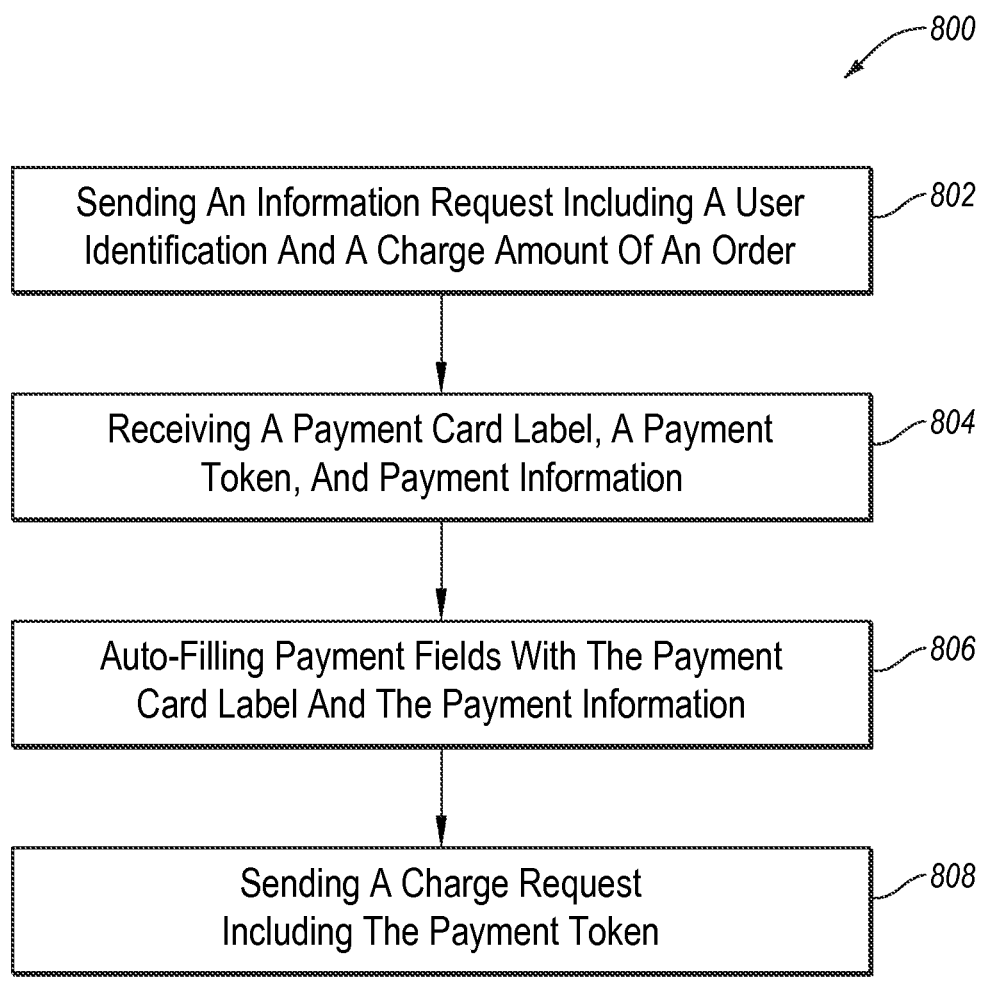
FIG. 8 illustrates a flowchart of a series of acts in another method of facilitating a financial transaction at a commerce application in accordance with one or more embodiments of the present invention.

Referring now to FIG. 8, a flowchart of one exemplary method 800 of facilitating a purchase at a commerce application from the perspective of the commerce application is illustrated. As shown the method 800 can include an act 802 of sending an information request including a user identification and a charge amount of an order. For example, act 802 can involve sending an information request 310 or 316 server computing device(s) 216. The request can be sent from a client-computing device 202 executing at least a first portion of a commerce application 104a. The request 310/316 can comprising a user identification of a user and a charge amount an order selected for purchase by the user using the commerce application 104a. In one or more embodiments, act 802 can include a call to a graph API of the network application 218.

Method 800 can further include an act 804 of receiving a payment card label, a payment token, and payment information. Specifically, act 804 can involve server computing device(s) 216 sending the payment card label, a payment token, and payment information 318 to the commerce application 104a. Method 800 can then involve an act 806 of auto-filling payment fields with the payment card label and the payment information. For example, the commerce application 104a can auto-fill the payment fields 513 of a checkout user interface 512 with the payment card label 528 and any additional payment information.

As shown by FIG. 8, method 800 can include an act 808 of sending a charge request including the payment token. More specifically, act 808 can involve sending the charge request 328 to the server computing device(s) 216. For example, act 808 can involve the server computing device 214 making a call to a payment API of the network application 218.

Figure 9:
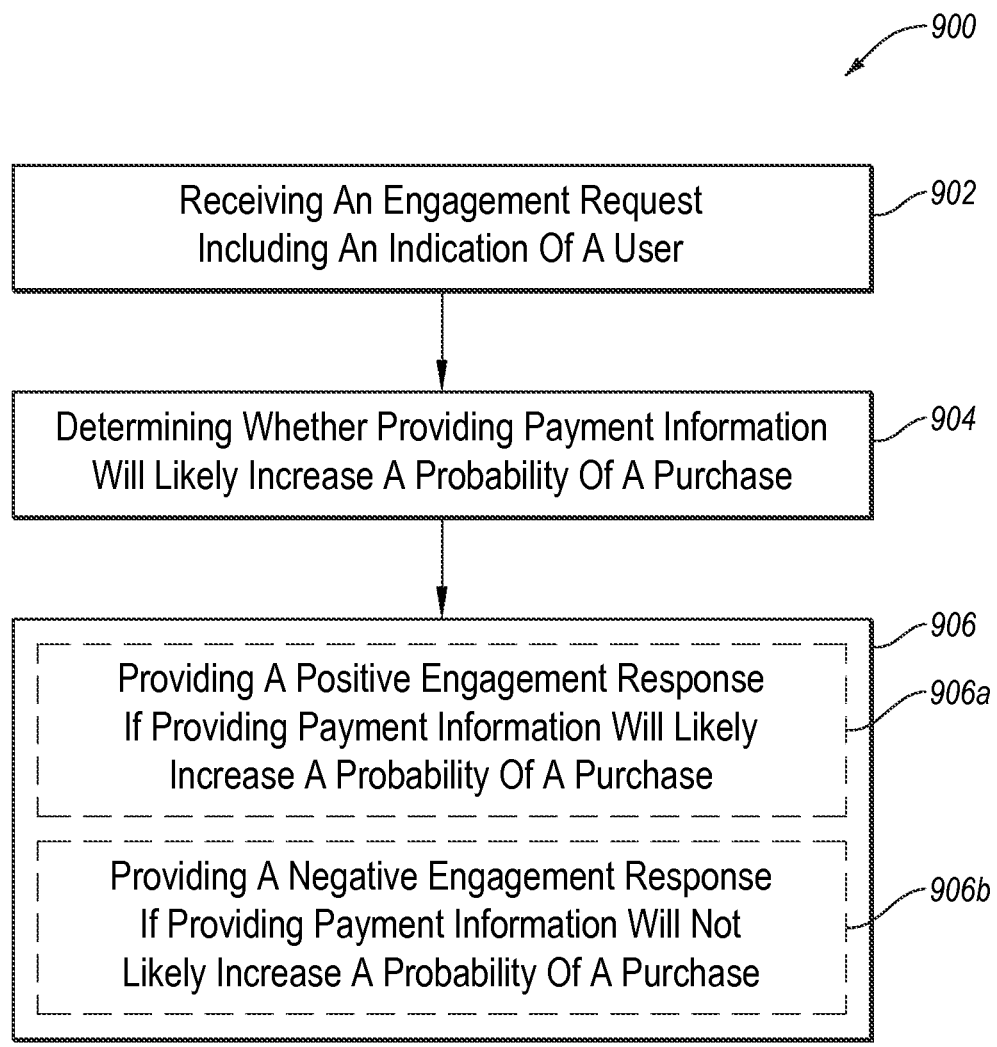
FIG. 9 illustrates a flowchart of a series of acts in a method of dynamically and intelligently providing a user the option of using payment information stored by the network application in accordance with one or more embodiments of the present invention.

Referring now to FIG. 9, a method 900 of intelligently and dynamically providing an option to use a network application to assist in a payment transaction from the perspective of the e-commerce payment facilitator 106a or network application 218 is shown. Method 900 can include an act 902 of receiving an engagement request including an indication of a user. In particular, act 902 can involve receiving, from a commerce application 104a, an engagement request 406 including an indication of a user who has selected one or more items or services for purchase from the commerce application 104. For example, act 902 can involve receiving an engagement call 406 to a graph API of the network application 218.

Method 900 can further include an act 904 of determining whether providing payment information will likely increase a probability of a purchase. More specifically, act 904 can involve determining 404 whether providing payment information will likely increase a probability that the user completes a purchase of the one or more items or services from the commerce application 104a. For example, act 904 can comprise any of the method described above in relation to FIG. 4 of making the determination whether to provide the payment option 404. For instance, act 904 can comprise determining a predicted conversion rate and determining whether the predicted conversion rate is greater than an average conversion rate of the commerce application 104a. Additionally or alternatively, act 904 can involve determining if payment information is available for the user 102.

Method 900 can also include an act 906 of providing an engagement response 406. Act 906 can involve step 906a of providing a positive engagement response or step 906b of providing a negative engagement response. Step 906a can include providing a positive engagement response 406 if providing the payment information will likely increase the probability that the user 102 completes the purchase of the one or more items or services from the commerce application 104a. On the other hand step 906b can include providing a negative engagement response 406 if providing the payment information will not likely increase the probability that the user 102 completes the purchase of the one or more items or services from the commerce application 104a.

Figure 10:
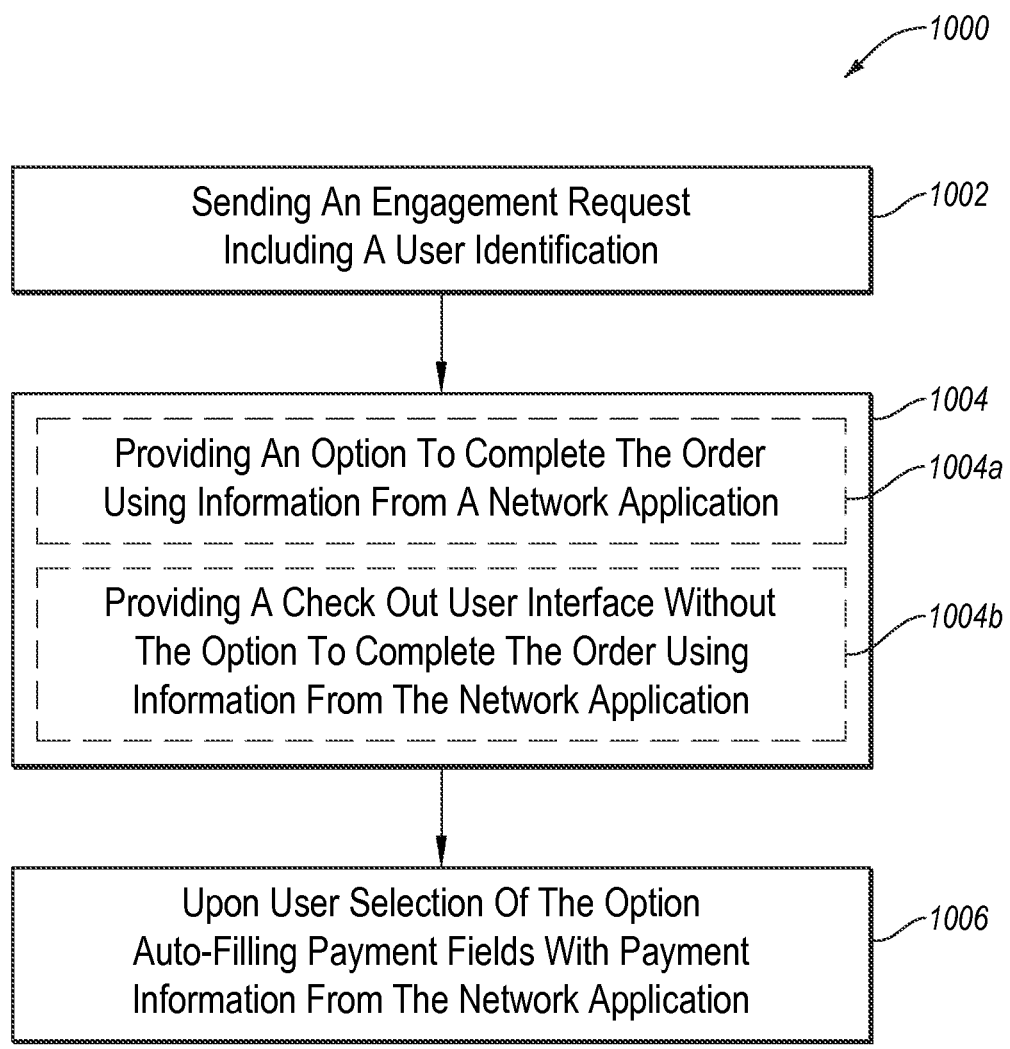
FIG. 10 illustrates a flowchart of a series of acts in another method of dynamically and intelligently providing a user the option of using payment information stored by the network application in accordance with one or more embodiments of the present invention.

FIG. 10 illustrates a method 1000 of intelligently and dynamically providing an option to use a network application to assist in a payment transaction from the perspective of the commerce application 104a. As shown, method 1000 can include an act 1002 of sending an engagement request including a user identification. More specifically, act 1002 can involve sending, from a client computing device 202 executing at least a first portion of a commerce application 104a, an engagement request 502 server computing device(s) 216 executing the network application 218. For example, act 1002 can involve sending an engagement call 406 to a graph API of the network application 218.

Method 1000 can further include an act 1004 of providing a user checkout interface. Act 1004 can involve step 1004a or step 1004b. Step 1004a can include providing an option to complete the order using information from the network application. In particular, step 1004a can involve rendering a selectable checkout option 514 that indicates that the user may utilize the network application 218/e-commerce payment facilitator 106a to complete the purchase of the items in the virtual cart of the commerce application 104a. For example, the commerce application 104a can call an SDK function that renders the selectable checkout option 514, as described above.

Step 1004b on the other hand can involve providing a user checkout interface without the option to complete the order using payment information from the network application. In particular, the commerce application 104a can render a checkout user interface 512 including payment fields 513. The commerce application 104a can render the checkout user interface 512 without rendering or otherwise providing the selectable checkout option 514.

Method 1000 can also include an act 1006 of auto-filling payment fields with payment information from the network application upon user selection of the option. In particular, act 1006 can involve entering payment information received from the network application 218 into payment fields 513 of a user check out interface 512. The payment information can include a name, a billing address, and a payment card label 528. The payment information can be received from the network application 218 in response to payment API call sent from the commerce application 104a.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. In certain particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the invention. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Figure 11:
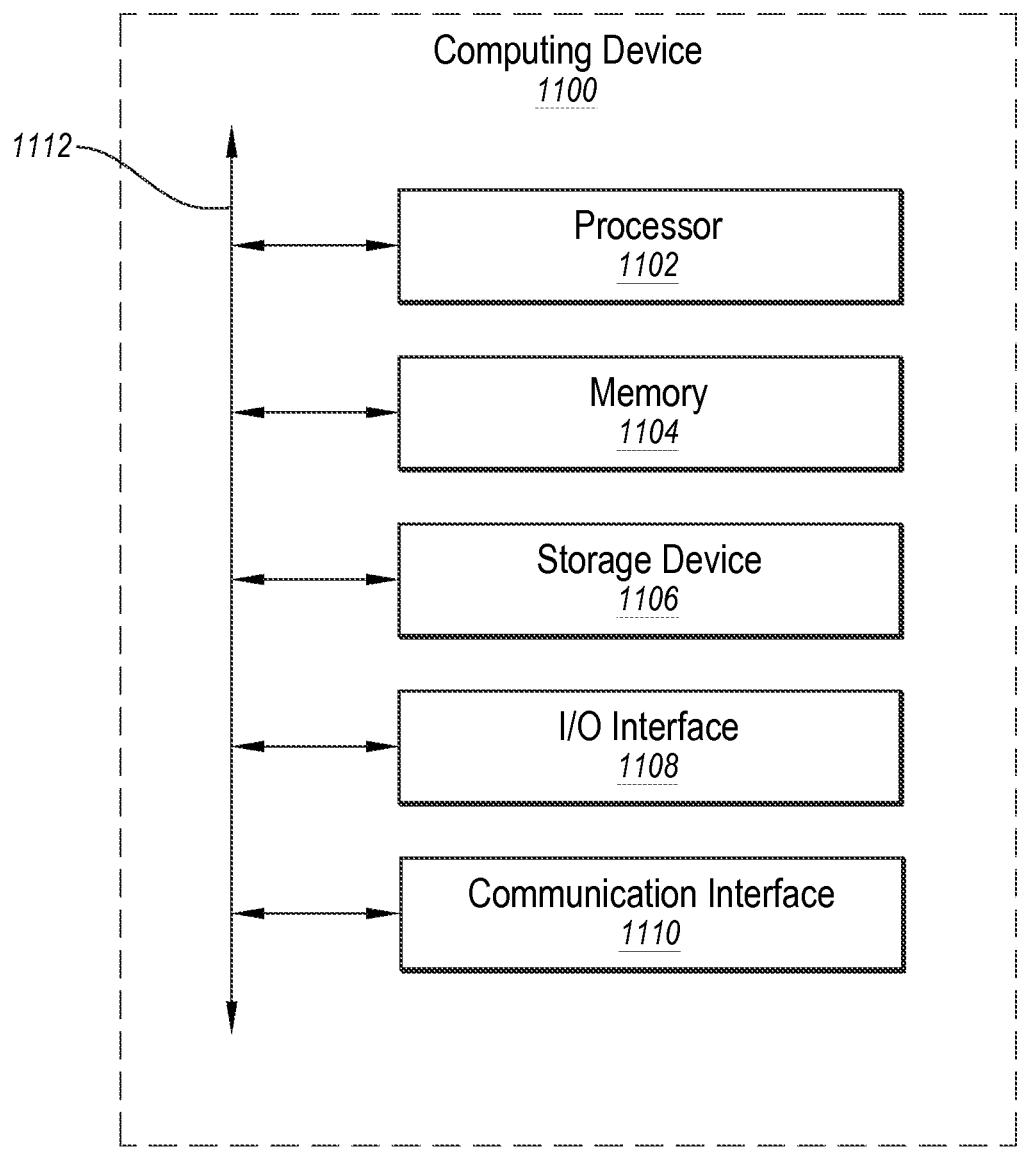
FIG. 11 illustrates a block diagram of an exemplary computing device in accordance with one or more embodiments of the present invention.

FIG. 11 illustrates, in block diagram form, an exemplary computing device 1100 that may be configured to perform one or more of the processes described above. One will appreciate that the computing device 202, server computing device 215, server computing device 216, and the mobile device 500 can each comprise implementations of the data-computing device 1100. As shown by FIG. 11, the computing device can comprise a processor 1102, memory 1104, a storage device 1106, an I/O interface 1108, and a communication interface 1110. While an exemplary computing device 1100 is shown in FIG. 11, the components illustrated in FIG. 11 are not intended to be limiting. Additional or alternative components may be used in other embodiments. Furthermore, in certain embodiments, a computing device 1100 can include fewer components than those shown in FIG. 11. Components of computing device 1100 shown in FIG. 11 will now be described in additional detail.

In particular embodiments, processor(s) 1102 includes hardware for executing instructions, such as those making up a computer program. As an example and not by way of limitation, to execute instructions, processor(s) 1102 may retrieve (or fetch) the instructions from an internal register, an internal cache, memory 1104, or a storage device 1106 and decode and execute them. In particular embodiments, processor(s) 1102 may include one or more internal caches for data, instructions, or addresses. As an example and not by way of limitation, processor(s) 1102 may include one or more instruction caches, one or more data caches, and one or more translation lookaside buffers (TLBs). Instructions in the instruction caches may be copies of instructions in memory 1104 or storage 1106.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example and not by way of limitation, storage device 1106 can comprise a non-transitory storage medium described above. The storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to the computing device 1100. In particular embodiments, storage device 1106 is non-volatile, solid-state memory. In particular embodiments, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1100 also includes one or more input or output ("I/O") devices/interfaces 1108, which are provided to allow a user to provide input to, receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a stylus or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1110. As an example and not by way of limitation, computing device 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1100 may include any suitable communication interface 1110 for any of these networks, where appropriate.

The computing device 1100 can further include a bus 1112. The bus 1112 can comprise hardware, software, or both that couples components of computing device 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the network application 218 can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 12:
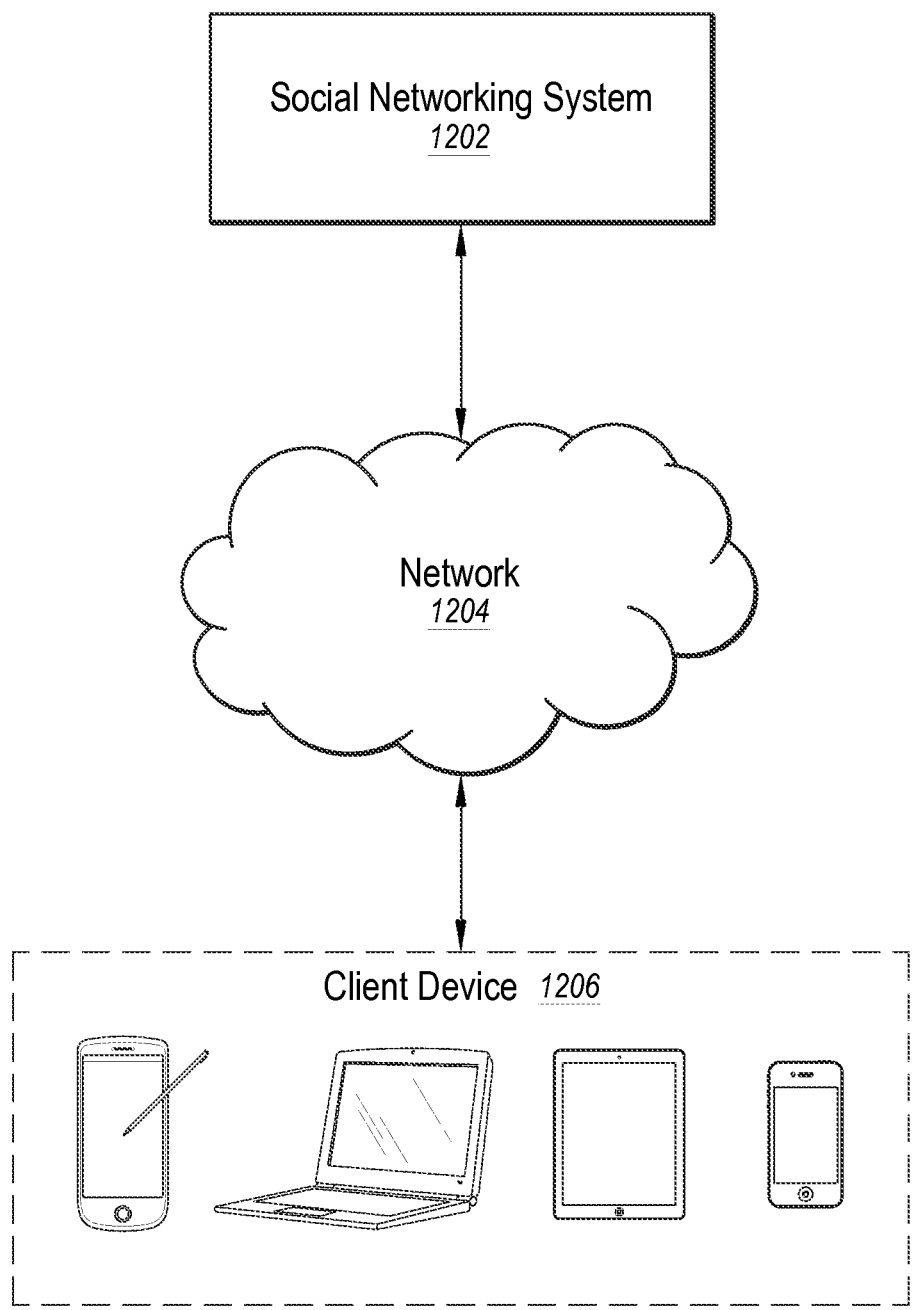
FIG. 12 is an example network environment of a social networking system in accordance with one or more embodiments of the present invention.

FIG. 12 illustrates an example network environment of a social-networking system. In particular embodiments, a social-networking system 1200 may comprise one or more data stores. In particular embodiments, the social-networking system 1200 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 1200 may comprise one or more computing devices (e.g., servers) hosting functionality directed to operation of the social-networking system. A user of the social-networking system 1200 may access the social-networking system 1200 using a client device such as client device 1206. In particular embodiments, the client device 1206 can interact with the social-networking system 1202 through a network 1204.

The client device 1206 may be a desktop computer, laptop computer, tablet computer, personal digital assistant (PDA), in- or out-of-car navigation system, smart phone or other cellular or mobile phone, or mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over a network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access the social-networking system 1200.

While these methods, systems, and user interfaces utilize both publicly available information as well as information provided by users of the social-networking system, all use of such information is to be explicitly subject to all privacy settings of the involved users and the privacy policy of the social-networking system as a whole.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:
   receiving an engagement request, at one or more servers of a network application from a client device, including an indication that a user has begun a transaction using a client application on the client device;
   determining, by the one or more servers in response to the engagement request, whether providing personal information maintained at the network application will increase a probability that the user completes the transaction using the client application on the client device;
   dynamically displaying, in a user interface of the client application, a user selectable option to complete the transaction using the personal information maintained by the one or more servers of the network application based on a determination that providing the personal information from the network application will increase the probability that the user completes the transaction using the client application on the client device; and
   dynamically refraining from displaying, in the user interface of the client application, the user selectable option to complete the transaction using the personal information maintained by the one or more servers of the network application based on a determination that providing the personal information from the network application will not increase the probability that the user completes the transaction using the client application on the client device.

2. The method as recited in claim 1, further comprising determining one or more factors for the user related to the use of the selectable option, the one or more factors comprising one or more of: whether the user has an account with the network application, whether the user is currently logged into the network application, whether personal information is available for the user, a conversion rate for the user when the selectable option was presented for a past transaction, or a history of activity for the user with the network application; and
   wherein determining whether providing personal information maintained at the network application in response to the engagement request will increase a probability that the user completes the transaction using the client application on the client device is based on the one or more determined factors for the user related to the use of the selectable option.

3. The method as recited in claim 1, wherein determining whether providing personal information will increase the probability that the user completes the transaction using the client application on the client device comprises determining if personal information is available for the user on the one more servers of the network application.

4. The method as recited in claim 3, wherein determining if personal information is available for the user comprises determining if a payment card is on file for the user on the one or more servers of the network application.

5. The method as recited in claim 1, further comprising, based on the determination that providing the personal information from the network application will increase the probability that the user completes the transaction using the client application on the client device, providing the user selectable option to complete the transaction using the personal information maintained by the one or more servers of the network application only if the user is currently logged into the network application.

6. The method as recited in claim 5, wherein the network application comprises a social networking application.

7. The method as recited in claim 1, further comprising determining a predicted conversion rate, wherein determining whether providing personal information will increase the probability that the user completes the transaction using the client application on the client device comprises determining whether the predicted conversion rate is greater than an average conversion rate of the client application.

8. The method as recited in 7, wherein the predicted conversion rate is based on data specific to the user.

9. The method as recited in claim 8, wherein the predicted conversion rate is based on a percentage of times the user has completed a transaction using any client application when presented with the user selectable option to complete a transaction using the personal information provided by the network application.

10. The method as recited in claim 8, wherein the predicted conversion rate is based on a percentage of times users of an age, gender or other demographic shared with the user have completed a transaction when presented with the user selectable option to use personal information provided by the network application.

11. The method as recited in claim 1, further comprising:
    calculating a risk score based on risk data associated with the user; and
    using the risk score in determining whether providing personal information will increase the probability that the user completes the transaction using the client application on the client device; or
    sending the risk score to the client application on the client device.

12. The method as recited in claim 1, further comprising:
    tracking information corresponding to the user; and
    using the tracked information in determining whether providing personal information will increase the probability that the user completes the transaction using the client application using the client device.

13. The method as recited in claim 12, wherein tracking information corresponding to the user comprises tracking at least one of demographic information of the user, past purchases of the user, user interests of the user, or activity for the user with applications.

14. A system comprising:
    one or more server computing devices executing a network application;
    a non-transitory storage medium comprising instructions that, when executed by the one or more server computing devices, cause the system to:
    receive an engagement request, from a client device, including an indication that a user has begun a transaction using a client application on the client device;
    determine, in response to the engagement request, whether providing personal information maintained at the network application will increase a probability that the user completes the transaction using the client application on the client device;
    dynamically displaying, in a user interface of the client application, a user selectable option to complete the transaction using the personal information maintained by the one or more servers of the network application based on a determination that providing the personal information from the network application will increase the probability that the user completes the transaction using the client application on the client device; and
    dynamically refraining from displaying, in the user interface of the client application, the user selectable option to complete the transaction using the personal information maintained by the one or more server computing devices of the network application based on a determination that providing the personal information from the network application will not increase the probability that the user completes the transaction using the client application on the client device.

15. The system as recited in claim 14, further comprising instructions that, when executed by the one or more server computing devices, cause the system to:
   track information corresponding to the user; and
   use the tracked information in determining whether providing personal information will increase a probability that the user completes the transaction using the client application on the client device.

16. The system as recited in claim 15, wherein the tracked information corresponding to the user comprises at least one of demographic information of the user, past purchases of the user, or activity for the user with commerce applications.

17. The system as recited in claim 14, further comprising instructions that, when executed by the one or more server computing devices, cause the system to, based on the determination that providing the personal information from the network application will increase the probability that the user completes the transaction using the client application on the client device, provide the user selectable option to complete the transaction using the personal information only if the user is currently logged into a pre-determined network application.

18. The system as recited in claim 17, wherein the pre-determined network application comprises a social networking application.

19. The system as recited in claim 14, wherein the instructions, when executed by the one or more server computing devices cause the system to determine whether providing personal information will increase the probability that the user completes the transaction using the client application on the client device by:
   determining a predicted conversion rate for the user; and
   determining whether the predicted conversion rate for the user is greater than an average conversion rate of the client application.

20. The system as recited in claim 19, wherein the predicted conversion rate is based on at least one of:
   a percentage of times the user has completed a transaction when presented with the selectable option to compete a transaction using any commerce application;
   a percentage of times users of the network application using any commerce application have completed a transaction when presented with the option to compete the transaction using personal information maintained by the network application; or
   a percentage of times users having a similar amount of personal information have completed a transaction when presented with the selectable option to compete the transaction using personal information maintained by the network application.

\* \* \* \* \*